(12) United States Patent
Morton

(10) Patent No.: US 11,307,325 B2
(45) Date of Patent: *Apr. 19, 2022

(54) COVERT SURVEILLANCE USING MULTI-MODALITY SENSING

(71) Applicant: Rapiscan Systems, Inc., Torrance, CA (US)

(72) Inventor: Edward James Morton, Guildford (GB)

(73) Assignee: Rapiscan Systems, inc., Torrance, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/889,638

(22) Filed: Jun. 1, 2020

(65) Prior Publication Data

US 2020/0386904 A1  Dec. 10, 2020

Related U.S. Application Data

(63) Continuation of application No. 16/524,455, filed on Jul. 29, 2019, now Pat. No. 10,942,291, which is a
(Continued)

(51) Int. Cl.
*G01V 5/00* (2006.01)

(52) U.S. Cl.
CPC .......... *G01V 5/0033* (2013.01); *G01V 5/0025* (2013.01); *G01V 5/0041* (2013.01)

(58) Field of Classification Search
CPC ...... G01V 5/00; G01V 5/0033; G01V 5/0041; G01V 5/0025; G01V 5/0008;
(Continued)

(56) References Cited

U.S. PATENT DOCUMENTS 2,831,123 A   4/1958 Daly
2,971,433 A   2/1961 Akin
(Continued)

FOREIGN PATENT DOCUMENTS

CN    1745296 A    3/2006
CN    107209282 A  9/2017
(Continued)

OTHER PUBLICATIONS

Mobile X-Ray Inspection Systems, Internet Citation, Feb. 12, 2007, pp. 1-2, URL:http://web.archive.org/web/20070212000928/http://www.bombdetecti- on.com/cat--details.php?catid=20.
(Continued)

*Primary Examiner* — Jurie Yun
(74) *Attorney, Agent, or Firm* — Novel IP

(57) ABSTRACT

The present specification discloses a covert mobile inspection vehicle with a backscatter X-ray scanning system that has an X-ray source and detectors for obtaining a radiographic image of an object outside the vehicle. The systems preferably include at least one sensor for determining a distance from at least one of the detectors to points on the surface of the object being scanned, a processor for processing the obtained radiographic image by using the determined distance of the object to obtain an atomic number of each material contained in the object, and one or more sensors to obtain surveillance data from a predefined area surrounding the vehicle.

22 Claims, 10 Drawing Sheets

Related U.S. Application Data continuation of application No. 15/455,557, filed on Mar. 10, 2017, now Pat. No. 10,408,967, which is a continuation of application No. 14/531,460, filed on Nov. 3, 2014, now Pat. No. 9,632,205, which is a continuation of application No. 13/368,202, filed on Feb. 7, 2012, now Pat. No. 8,903,046.

(60) Provisional application No. 61/440,834, filed on Feb. 8, 2011.

(58) Field of Classification Search
CPC ...... G01V 5/0016; G01N 23/00; G01N 23/20; G01N 23/203; G01N 23/201; G01N 23/04
See application file for complete search history.

(56) References Cited

U.S. PATENT DOCUMENTS

| | | |
|---|---|---|
| 2,972,430 A | 2/1961 | Johnson |
| 3,374,355 A | 3/1968 | Parratt |
| 3,676,783 A | 7/1972 | Kinbara |
| 3,766,387 A | 10/1973 | Heffan |
| 3,767,850 A | 10/1973 | Mc |
| 3,770,955 A | 11/1973 | Tomita |
| 3,784,837 A | 1/1974 | Holmstrom |
| 3,904,923 A | 9/1975 | Schwartz |
| 3,961,186 A | 6/1976 | Leunbach |
| 3,988,586 A | 10/1976 | Stuart |
| 4,031,401 A | 6/1977 | Jacob |
| 4,047,035 A | 9/1977 | Dennhoven |
| 4,064,440 A | 12/1977 | Roder |
| 4,139,771 A | 2/1979 | Dennhoven |
| 4,210,811 A | 7/1980 | Dennhoven |
| 4,216,499 A | 8/1980 | Dennhoven |
| 4,242,583 A | 12/1980 | Annis |
| 4,260,898 A | 4/1981 | Annis |
| 4,315,146 A | 2/1982 | Rudin |
| 4,342,914 A | 8/1982 | Bjorkholm |
| 4,366,382 A | 12/1982 | Kotowski |
| 4,380,817 A | 4/1983 | Harding |
| 4,420,182 A | 12/1983 | Kaneshiro |
| 4,430,568 A | 2/1984 | Yoshida |
| 4,472,822 A | 9/1984 | Swift |
| 4,503,332 A | 3/1985 | Annis |
| 4,525,854 A | 6/1985 | Molbert |
| 4,563,707 A | 1/1986 | Kishida |
| 4,566,113 A | 1/1986 | Doenges |
| 4,599,740 A | 7/1986 | Cable |
| 4,626,688 A | 12/1986 | Barnes |
| 4,641,330 A | 2/1987 | Herwig |
| 4,646,339 A | 2/1987 | Rice |
| 4,709,382 A | 11/1987 | Sones |
| 4,736,401 A | 4/1988 | Donges |
| 4,788,704 A | 11/1988 | Donges |
| 4,799,247 A | 1/1989 | Annis |
| 4,809,312 A | 2/1989 | Annis |
| 4,817,123 A | 3/1989 | Sones |
| 4,825,454 A | 4/1989 | Annis |
| 4,853,595 A | 8/1989 | Alfano |
| 4,864,142 A | 9/1989 | Gomberg |
| 4,870,670 A | 9/1989 | Geus |
| 4,872,188 A | 10/1989 | Lauro |
| 4,884,289 A | 11/1989 | Glockmann |
| 4,975,917 A | 12/1990 | Villa |
| 4,979,202 A | 12/1990 | Siczek |
| 4,991,189 A | 2/1991 | Boomgaarden |
| 5,006,299 A | 4/1991 | Gozani |
| 5,014,293 A | 5/1991 | Boyd |
| 5,022,062 A | 6/1991 | Annis |
| 5,065,418 A | 11/1991 | Bermbach |
| 5,076,993 A | 12/1991 | Sawa |
| 5,091,924 A | 2/1992 | Bermbach |
| 5,098,640 A | 3/1992 | Gozani |
| 5,103,099 A | 4/1992 | Bourdinaud |
| 5,114,662 A | 5/1992 | Gozani |
| 5,179,581 A | 1/1993 | Annis |
| 5,181,234 A | 1/1993 | Smith |
| 5,182,764 A | 1/1993 | Peschmann |
| 5,185,778 A | 2/1993 | Magram |
| 5,202,932 A | 4/1993 | Cambier |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,313,511 A | 5/1994 | Annis |
| 5,319,547 A | 6/1994 | Krug |
| 5,367,552 A | 11/1994 | Peschmann |
| 5,379,334 A | 1/1995 | Zimmer |
| 5,391,878 A | 2/1995 | Petroff |
| 5,394,454 A | 2/1995 | Harding |
| 5,430,787 A | 7/1995 | Norton |
| 5,493,596 A | 2/1996 | Annis |
| 5,524,133 A | 6/1996 | Neale |
| 5,548,123 A | 8/1996 | Perez-Mendez |
| 5,548,630 A | 8/1996 | Hell |
| 5,600,303 A | 2/1997 | Husseiny |
| 5,600,700 A | 2/1997 | Krug |
| 5,602,894 A | 2/1997 | Bardash |
| 5,606,167 A | 2/1997 | Miller |
| 5,608,214 A | 3/1997 | Baron |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,692,028 A | 11/1997 | Geus |
| 5,692,029 A | 11/1997 | Husseiny |
| 5,696,806 A | 12/1997 | Grodzins |
| 5,751,837 A | 5/1998 | Watanabe |
| 5,763,886 A | 6/1998 | Schulte |
| 5,763,903 A | 6/1998 | Mandai |
| 5,764,683 A | 6/1998 | Swift |
| 5,768,334 A | 6/1998 | Maitrejean |
| 5,783,829 A | 7/1998 | Sealock |
| 5,787,145 A | 7/1998 | Geus |
| 5,805,660 A | 9/1998 | Perion |
| 5,838,759 A | 11/1998 | Armistead |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,018,562 A | 1/2000 | Willson |
| 6,031,890 A | 2/2000 | Bermbach |
| 6,058,158 A | 5/2000 | Eiler |
| 6,067,344 A | 5/2000 | Grodzins |
| 6,078,052 A | 6/2000 | Difilippo |
| 6,081,580 A | 6/2000 | Grodzins |
| 6,094,472 A | 7/2000 | Smith |
| 6,125,165 A | 9/2000 | Warburton |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,212,251 B1 | 4/2001 | Tomura |
| 6,216,540 B1 | 4/2001 | Nelson |
| 6,218,943 B1 | 4/2001 | Ellenbogen |
| 6,236,709 B1 | 5/2001 | Perry |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,320,933 B1 | 11/2001 | Grodzins |
| 6,347,132 B1 | 2/2002 | Annis |
| 6,356,620 B1 | 3/2002 | Rothschild |
| 6,418,194 B1 | 7/2002 | McPherson |

(56) References Cited

U.S. PATENT DOCUMENTS

| | | |
|---|---|---|
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,448,564 B1 | 9/2002 | Johnson |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,543,599 B2 | 4/2003 | Jasinetzky |
| 6,546,072 B1 | 4/2003 | Chalmers |
| 6,552,346 B2 | 4/2003 | Verbinski |
| 6,556,653 B2 | 4/2003 | Hussein |
| 6,563,903 B2 | 5/2003 | Kang |
| 6,567,496 B1 | 5/2003 | Sychev |
| 6,580,778 B2 | 6/2003 | Meder |
| 6,584,170 B2 | 6/2003 | Aust |
| 6,597,760 B2 | 7/2003 | Beneke |
| 6,605,473 B1 | 8/2003 | Hajduk |
| 6,606,516 B2 | 8/2003 | Levine |
| 6,636,581 B2 | 10/2003 | Sorenson |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,727,506 B2 | 4/2004 | Mallette |
| 6,735,279 B1 | 5/2004 | Jacobs |
| 6,763,635 B1 | 7/2004 | Lowman |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,134 B2 | 1/2005 | Saito |
| 6,839,403 B1 | 1/2005 | Kotowski |
| 6,843,599 B2 | 1/2005 | Le |
| 6,876,719 B2 | 4/2005 | Ozaki |
| 6,879,657 B2 | 4/2005 | Hoffman |
| 6,920,197 B2 | 7/2005 | Kang |
| 6,928,141 B2 | 8/2005 | Carver |
| 6,965,314 B2 | 11/2005 | Jerry |
| 7,039,159 B2 | 5/2006 | Muenchau |
| 7,045,788 B2 | 5/2006 | Iwatschenko-Borho |
| 7,099,434 B2 | 8/2006 | Adams |
| 7,103,137 B2 | 9/2006 | Seppi |
| 7,115,875 B1 | 10/2006 | Worstell |
| 7,116,235 B2 | 10/2006 | Alioto |
| RE39,396 E | 11/2006 | Swift |
| 7,151,447 B1 | 12/2006 | Willms |
| 7,162,005 B2 | 1/2007 | Bjorkholm |
| 7,166,844 B1 | 1/2007 | Gormley |
| 7,203,276 B2 | 4/2007 | Arsenault |
| 7,207,713 B2 | 4/2007 | Lowman |
| 7,215,737 B2 | 5/2007 | Li |
| 7,218,704 B1 | 5/2007 | Adams |
| 7,238,951 B2 | 7/2007 | Disdier |
| 7,244,947 B2 | 7/2007 | Polichar |
| 7,260,255 B2 | 8/2007 | Polichar |
| 7,277,526 B2 | 10/2007 | Rifkin |
| 7,308,076 B2 | 12/2007 | Studer |
| 7,322,745 B2 | 1/2008 | Agrawal |
| 7,333,587 B2 | 2/2008 | De |
| 7,352,843 B2 | 4/2008 | Hu |
| 7,369,463 B1 | 5/2008 | Van Dullemen |
| 7,372,040 B2 | 5/2008 | Polichar |
| 7,379,530 B2 | 5/2008 | Hoff |
| 7,400,701 B1 | 7/2008 | Cason |
| 7,420,174 B2 | 9/2008 | Kurita |
| 7,453,987 B1 | 11/2008 | Richardson |
| 7,483,511 B2 | 1/2009 | Bendahan |
| 7,486,768 B2 | 2/2009 | Allman |
| 7,505,556 B2 | 3/2009 | Chalmers |
| 7,505,557 B2 | 3/2009 | Modica |
| 7,517,149 B2 | 4/2009 | Agrawal |
| 7,519,148 B2 | 4/2009 | Kotowski |
| 7,525,101 B2 | 4/2009 | Grodzins |
| 7,547,888 B2 | 6/2009 | Cooke |
| 7,551,715 B2 | 6/2009 | Rothschild |
| 7,555,099 B2 | 6/2009 | Rothschild |
| 7,593,506 B2 | 9/2009 | Cason |
| 7,593,510 B2 | 9/2009 | Rothschild |
| 7,609,807 B2 | 10/2009 | Leue |
| 7,649,976 B2 | 1/2010 | Georgeson |
| 7,720,195 B2 | 5/2010 | Allman |
| 7,724,869 B2 | 5/2010 | Wang |
| 7,738,687 B2 | 6/2010 | Tortora |
| 7,741,612 B2 | 6/2010 | Clothier |
| 7,742,568 B2 | 6/2010 | Smith |
| 7,760,103 B2 | 7/2010 | Frank |
| 7,783,003 B2 | 8/2010 | Clayton |
| 7,783,004 B2 | 8/2010 | Kotowski |
| 7,800,073 B2 | 9/2010 | Clothier |
| 7,809,104 B2 | 10/2010 | Foland |
| 7,809,109 B2 | 10/2010 | Mastronardi |
| 7,817,776 B2 | 10/2010 | Agrawal |
| 7,844,028 B2 | 11/2010 | Korsunsky |
| 7,860,213 B2 | 12/2010 | Akery |
| 7,876,879 B2 | 1/2011 | Morton |
| 7,876,880 B2 | 1/2011 | Kotowski |
| 7,952,079 B2 | 5/2011 | Neustadter |
| 7,957,506 B2 | 6/2011 | Smith |
| 7,963,695 B2 | 6/2011 | Kotowski |
| 7,995,705 B2 | 8/2011 | Allman |
| 8,000,436 B2 | 8/2011 | Seppi |
| 8,031,903 B2 | 10/2011 | Paresi |
| 8,173,970 B2 | 5/2012 | Inbar |
| 8,194,822 B2 | 6/2012 | Rothschild |
| 8,263,938 B2 | 9/2012 | Bjorkholm |
| 8,275,091 B2 | 9/2012 | Morton |
| 8,389,941 B2 | 3/2013 | Bendahan |
| 8,389,942 B2 | 3/2013 | Morton |
| 8,451,974 B2 | 5/2013 | Morton |
| 8,502,699 B2 | 8/2013 | Zerwekh |
| 8,503,605 B2 | 8/2013 | Morton |
| 8,831,176 B2 | 9/2014 | Morto |
| 8,903,046 B2 | 12/2014 | Morton |
| 8,929,509 B2 | 1/2015 | Morton |
| 9,146,201 B2 | 9/2015 | Schubert |
| 9,285,488 B2 | 3/2016 | Arodzero |
| 9,632,205 B2 | 4/2017 | Morton |
| 10,770,195 B2 | 9/2020 | Rothschild |
| 2001/0016028 A1 | 8/2001 | Adams |
| 2004/0017888 A1 | 1/2004 | Seppi |
| 2004/0086078 A1 | 5/2004 | Adams |
| 2004/0125914 A1 | 7/2004 | Kang |
| 2004/0141584 A1 | 7/2004 | Bernardi |
| 2004/0178339 A1 | 9/2004 | Gentile |
| 2004/0258198 A1 | 12/2004 | Carver |
| 2005/0023479 A1 | 2/2005 | Grodzins |
| 2005/0117700 A1 | 6/2005 | Peschmann |
| 2005/0135668 A1 | 6/2005 | Polichar |
| 2005/0156734 A1 | 7/2005 | Zerwekh |
| 2005/0157842 A1 | 7/2005 | Agrawal |
| 2005/0161611 A1 | 7/2005 | Disdier |
| 2005/0169421 A1 | 8/2005 | Muenchau |
| 2005/0226383 A1 | 10/2005 | Rifkin |
| 2005/0275545 A1 | 12/2005 | Alioto |
| 2006/0027751 A1 | 2/2006 | Kurita |
| 2006/0176998 A1 | 8/2006 | Korsunsky |
| 2006/0284094 A1 | 12/2006 | Inbar |
| 2007/0007455 A1 | 1/2007 | Juni |
| 2007/0009088 A1 | 1/2007 | Edic |
| 2007/0085010 A1 | 4/2007 | Letant |

(56) References Cited

U.S. PATENT DOCUMENTS

| | | |
|---|---|---|
| 2007/0110215 A1 | 5/2007 | Hu |
| 2007/0140423 A1 | 6/2007 | Foland |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0235655 A1 | 10/2007 | Rhiger |
| 2007/0237294 A1 | 10/2007 | Hoff |
| 2007/0269005 A1 | 11/2007 | Chalmers |
| 2007/0272874 A1 | 11/2007 | Grodzins |
| 2007/0280416 A1 | 12/2007 | Bendahan |
| 2007/0280502 A1 | 12/2007 | Paresi |
| 2007/0286337 A1 | 12/2007 | Wang |
| 2008/0037707 A1 | 2/2008 | Rothschild |
| 2008/0043913 A1 | 2/2008 | Annis |
| 2008/0044801 A1 | 2/2008 | Modica |
| 2008/0048872 A1 | 2/2008 | Frank |
| 2008/0084963 A1 | 4/2008 | Clayton |
| 2008/0128624 A1 | 6/2008 | Cooke |
| 2008/0152081 A1 | 6/2008 | Cason |
| 2008/0205594 A1 | 8/2008 | Bjorkholm |
| 2008/0304622 A1 | 12/2008 | Morton |
| 2009/0067575 A1 | 3/2009 | Seppi |
| 2009/0086907 A1 | 4/2009 | Smith |
| 2009/0103686 A1 | 4/2009 | Rothschild |
| 2009/0116617 A1 | 5/2009 | Mastronardi |
| 2009/0127459 A1 | 5/2009 | Neustadter |
| 2009/0140158 A1 | 6/2009 | Clothier |
| 2009/0200480 A1 | 8/2009 | Clothier |
| 2009/0238336 A1 | 9/2009 | Akery |
| 2009/0257555 A1 | 10/2009 | Chalmers |
| 2010/0177868 A1 | 7/2010 | Smith |
| 2011/0019797 A1 | 1/2011 | Morton |
| 2011/0135060 A1 | 6/2011 | Morton |
| 2011/0204243 A1 | 8/2011 | Bendahan |
| 2012/0134473 A1 | 5/2012 | Morton |
| 2012/0201354 A1* | 8/2012 | Kimura ............... A61B 6/505 378/62 |
| 2013/0202089 A1 | 8/2013 | Schubert |
| 2013/0208857 A1 | 8/2013 | Arodzero |
| 2017/0358380 A1 | 12/2017 | Rothschild |
| 2018/0294066 A1 | 10/2018 | Rothschild |
| 2019/0346382 A1 | 11/2019 | Rothschild |

FOREIGN PATENT DOCUMENTS

| | | |
|---|---|---|
| EP | 0077018 A1 | 4/1983 |
| EP | 0176314 | 4/1986 |
| EP | 0261984 A2 | 3/1988 |
| EP | 0287707 | 10/1988 |
| EP | 0864884 A2 | 9/1998 |
| EP | 0919186 A2 | 6/1999 |
| EP | 1413898 A1 | 4/2004 |
| EP | 1135700 | 3/2005 |
| EP | 1526392 | 4/2005 |
| EP | 1739460 A2 | 1/2007 |
| EP | 1254384 | 1/2008 |
| EP | 1907831 A2 | 4/2008 |
| EP | 2054741 | 5/2009 |
| EP | 1733213 | 2/2010 |
| EP | 2049888 | 5/2014 |
| GB | 2084829 A | 4/1982 |
| GB | 2150526 A | 7/1985 |
| GB | 2255634 A | 11/1992 |
| GB | 2277013 A | 10/1994 |
| GB | 2424065 A | 9/2006 |
| GB | 2438317 A | 11/2007 |
| WO | 1998002763 A1 | 1/1998 |
| WO | 1998003889 A1 | 1/1998 |
| WO | 1998020366 A1 | 5/1998 |
| WO | 9855851 A1 | 12/1998 |
| WO | 1999039189 A2 | 8/1999 |
| WO | 2004010127 A1 | 1/2004 |
| WO | 2004109331 | 12/2004 |
| WO | 2005079437 A2 | 9/2005 |
| WO | 2005098400 A2 | 10/2005 |
| WO | 2005121756 A2 | 12/2005 |
| WO | 2006036076 A1 | 4/2006 |
| WO | 2006045019 | 4/2006 |
| WO | 2006078691 A2 | 7/2006 |
| WO | 2006095188 | 9/2006 |
| WO | 2007035359 A2 | 3/2007 |
| WO | 2007051092 | 5/2007 |
| WO | 2007068933 A1 | 6/2007 |
| WO | 2008017983 A2 | 2/2008 |
| WO | 2009027667 A2 | 3/2009 |
| WO | 2009106803 A2 | 9/2009 |
| WO | 2009141613 | 11/2009 |
| WO | 2009141615 | 11/2009 |
| WO | 2009150416 A2 | 12/2009 |
| WO | 2011008718 A1 | 1/2011 |
| WO | 2011053972 A2 | 5/2011 |
| WO | 2011069024 A1 | 6/2011 |
| WO | 2011087861 A2 | 7/2011 |
| WO | 2011095810 | 8/2011 |
| WO | 2012058207 A2 | 5/2012 |
| WO | 2012174265 A1 | 12/2012 |
| WO | 2014058495 A2 | 4/2014 |
| WO | 2016081881 A1 | 5/2016 |
| WO | 2019217596 A1 | 11/2019 |

OTHER PUBLICATIONS

Molchanov P A et al: 'Nanosecond gated optical sensors for ocean optic applications' Sensors Applications Symposium, 2006. Proceedings of The 2006 IEEE Houston, Texas,USA Feb. 7-9, 2006, Piscataway, NJ, USA,IEEE, Feb. 7, 2006 (Feb. 7, 2006), pp. 147-150, XP010917671 ISBN: 978-0-7803-9580-0.

International Search Report PCT/US2012/024184, dated Jul. 27, 2012, Rapiscan Systems Inc.

International preliminary report on patentability PCT/US2012/024184, dated Aug. 13, 2013, Rapiscan Systems Inc.

Chou, C, "Fourier coded-aperture imaging in nuclear medicine", IEEE Proc. Sci. Meas. Technol., vol. 141. No. 3, May 1994, pp. 179-184.

Mertz, L.N., et al., "Rotational aperture synthesis for x rays", Journal. Optical Society of America, vol. 3, Dec. 1986, pp. 2167-2170.

Misso et al., "New developments in radiation detectors and electron multipliers", 1964, IEEE Transactions on Nuclear Science pp. 72-75.

"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20 [retrieved on Jan. 6, 2010].

* cited by examiner

*PRIOR ART*

COVERT SURVEILLANCE USING MULTI-MODALITY SENSING

CROSS-REFERENCE

The present specification is a continuation of U.S. patent application Ser. No. 13/368,202, of the same title, and filed on Feb. 7, 2012, which, in turn, relies on U.S. Provisional Patent Application No. 61/440,834, filed on Feb. 8, 2011, and entitled "Covert Surveillance Using Multi-Modality Sensing", for priority. The aforementioned application is incorporated herein by reference in its entirety.

FIELD

The present specification generally relates to the field of covert surveillance for detecting threat items and contraband, either in a vehicle or on a person, and more specifically to a covert mobile inspection vehicle which combines a plurality of detection and prevention components that may be deployed rapidly to a threat zone to aid detection and prevention of subversive activities.

BACKGROUND

Currently, there exists the threat of terrorism. To counter this threat, there is a requirement for systems to be put in place to detect and deal with subversive activity. Some of such systems known in the art are purely designed to detect subversive activity; others are designed to prevent subversive activity; while still other known systems are designed purely as a deterrent. For example, some systems are primarily physical (such as barriers and security agents), some rely on networks of sensors (such as CCTV systems) while others involve dedicated installations (such as radio jamming mast or X-ray scanning machines).

What is needed, however, are covert surveillance systems that can be effectuated with high mobility and speedy deployment and that allow the use of a plurality of surveillance data to enable more informed, robust and intelligent threat detection and prevention.

Accordingly, there is need for a covert mobile inspection vehicle that uses a plurality of prevention and detection components or sensors.

There is also need for a system that intelligently integrates and/or correlates surveillance information from the plurality of multi-modality sensors to detect and prevent subversive activities.

SUMMARY

In one embodiment, the present specification discloses a covert mobile inspection vehicle comprising: a backscatter X-ray scanning system comprising an X-ray source and a plurality of detectors for obtaining a radiographic image of an object outside the vehicle; at least one sensor for determining a distance from at least one of the plurality of detectors to points on the surface of the object; a processor for processing the obtained radiographic image by using the determined distance of the object to obtain an atomic number of each material contained in the object; and one or more sensors to obtain surveillance data from a predefined area surrounding the vehicle. In an embodiment, the sensor is a scanning laser range finder causing a beam of infra-red light to be scattered from the surface of the object wherein a time taken for the beam of infra-red light to return to the sensor is indicative of the distance to the surface of the object.

Further, in an embodiment, the processor causes an intensity correction to be applied to the obtained radiographic image thereby causing intensity of the image of an object located at a distance greater than a predefined distance to be reduced by a predefined factor and intensity of the image of an object located at a distance lesser than a predefined distance to be increased by a predefined factor.

In another embodiment, the processor implements an adaptive region based averaging method whereby backscattered X-rays from a first region of the object located at a distance greater than a predefined distance from the X-ray source are averaged over a second larger predefined region, causing a linear dimension of the first region to be sealed as a square of the distance from X-ray source to the object. In yet another embodiment, the adaptive region averaging method is implemented by using a statistical filter to determine if a first pixel of an obtained radiographic image is part of a first object or of a second adjacent object. Also, in an embodiment, one or more individual pixels in the obtained radiographic image are colored based on the determined distance of the object and an atomic number of each material contained in the object.

In another embodiment, the obtained distance of the object is used to provide a geometric correction to produce a true likeness of the shape of the object. In yet another embodiment, the X-ray source comprises an X-ray tube having a cathode-anode potential difference ranging from 160 kV to 320 kV and a tube current ranging from 1 mA to 50 mA for producing a broad spectrum of X-ray energies.

Further, in an embodiment, the plurality of detectors comprise one of: an inorganic scintillation detector such as NAI(TI), and an organic scintillator such as polyvinyl toluene; each detector being coupled with one or more light sensitive readout devices such as a photomultiplier tube or a photodiode. Also, in an embodiment, the plurality of detectors comprise semiconductor sensors having a wide bandgap such as, CdTe, CdZnTe or HgI which can operate at room temperature. In another embodiment, the plurality of detectors comprises semiconductor sensors having a narrow bandgap such as HPGe.

In yet another embodiment, the covert mobile inspection vehicle further comprises a data acquisition module comprising a plurality of detectors, photomultipliers/photodiodes and analog-to-digital converter circuitry. Also in an embodiment, the covert mobile inspection vehicle comprises at least one of: a GPS receiver, a scanning laser, a CCTV camera, an infra-red camera, an audio microphone, a directional RF antenna, a wide-band antenna, a chemical sensor, and a jamming device. In another embodiment, the covert mobile inspection vehicle also comprises an automated detection processor for: integrating and analysing in real time the surveillance data from the one or more sensors; and sending threat items obtained by analyzing the surveillance data for review to an operator via wired or wireless means. In another embodiment, the covert mobile inspection vehicle further comprises means for broadcasting the surveillance data to a central intelligence location in real time.

In an embodiment, the X-ray source comprises a multi-element scatter collimator to produce a fan beam of X rays for irradiating the object being scanned; backscattered X rays from the object being detected by a segmented detector array located behind the multi-element collimator and comprising one detector element corresponding to each collimator element.

In an embodiment, the present specification describes a method for obtaining an atomic number (Z) of each material contained in an object being scanned by a covert mobile inspection vehicle comprising: a backscatter X-ray scanning system comprising an X-ray source and a plurality of detectors for obtaining a radiographic image of the object; at least one sensor for determining a distance from at least one of the plurality of detectors to points on the surface of the object; and a processor for processing the obtained radiographic image by using the determined distance of the object to obtain an atomic number of each material contained in the object; the method comprising the steps of: determining a true extent of each region of the radiographic image by using a statistical filter; calculating a standard deviation of energies of pixels present in each region; calculating a product or the obtained standard deviation and a mean of the energies of pixels present in each region; and comparing the calculated product to a pre-determined scale where a low value of the product corresponds to a low Z material and a high value of the product corresponds to a high Z material.

In another embodiment, the present invention discloses a covert mobile inspection vehicle comprising: a backscatter X-ray scanning system comprising an X-ray source and a plurality of detectors for obtaining a radiographic image of an object outside the vehicle; and one or more sensors to obtain surveillance data from a predefined area surrounding the vehicle. In an embodiment, at least one of the sensors is a scanning laser range finder causing a beam of infra-red light to be scattered from the surface of the object; a time taken for the beam of infra-red light to return to the sensor is indicative of the distance to the surface of the object.

In an embodiment, the vehicle further comprises at least one sensor for determining a distance from at least one of the plurality of detectors to points on the surface of the object; and a processor for processing the obtained radiographic image by using the determined distance of the object to obtain an atomic number of each material contained in the object. In yet another embodiment, the processor causes an intensity correction to be applied to the obtained radiographic image thereby causing intensity of the image of an object located at a distance greater than a predefined distance to be reduced by a predefined factor and intensity of the image of an object located at a distance lesser than a predefined distance to be increased by a predefined factor.

In another embodiment, the plurality of detectors comprise one of: an inorganic scintillation detector such as NaI(TI), and an organic scintillator such as polyvinyl toluene; each detector being coupled with one or more light sensitive readout devices such as a photomultiplier tube or a photodiode. In yet another embodiment, the plurality of detectors comprise semiconductor sensors having a wide bandgap such as, CdTe, CdZnTe or HgI which can operate at room temperature. In a further embodiment, the plurality of detectors comprises semiconductor sensors having a narrow bandgap such as HPGe.

In an embodiment, the covert mobile inspection vehicle further comprises a data acquisition module comprising a plurality of detectors, photomultipliers/photodiodes and analog-to-digital converter circuitry. In another embodiment, the covert mobile inspection vehicle further comprises at least one of: a GPS receiver, a scanning laser, a CCTV camera, an infra-red camera, an audio microphone, a directional RF antenna, a wide-band antenna, a chemical sensor, and a jamming device.

The aforementioned and other embodiments of the present shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings.

DETAILED DESCRIPTION

Figure 1A:
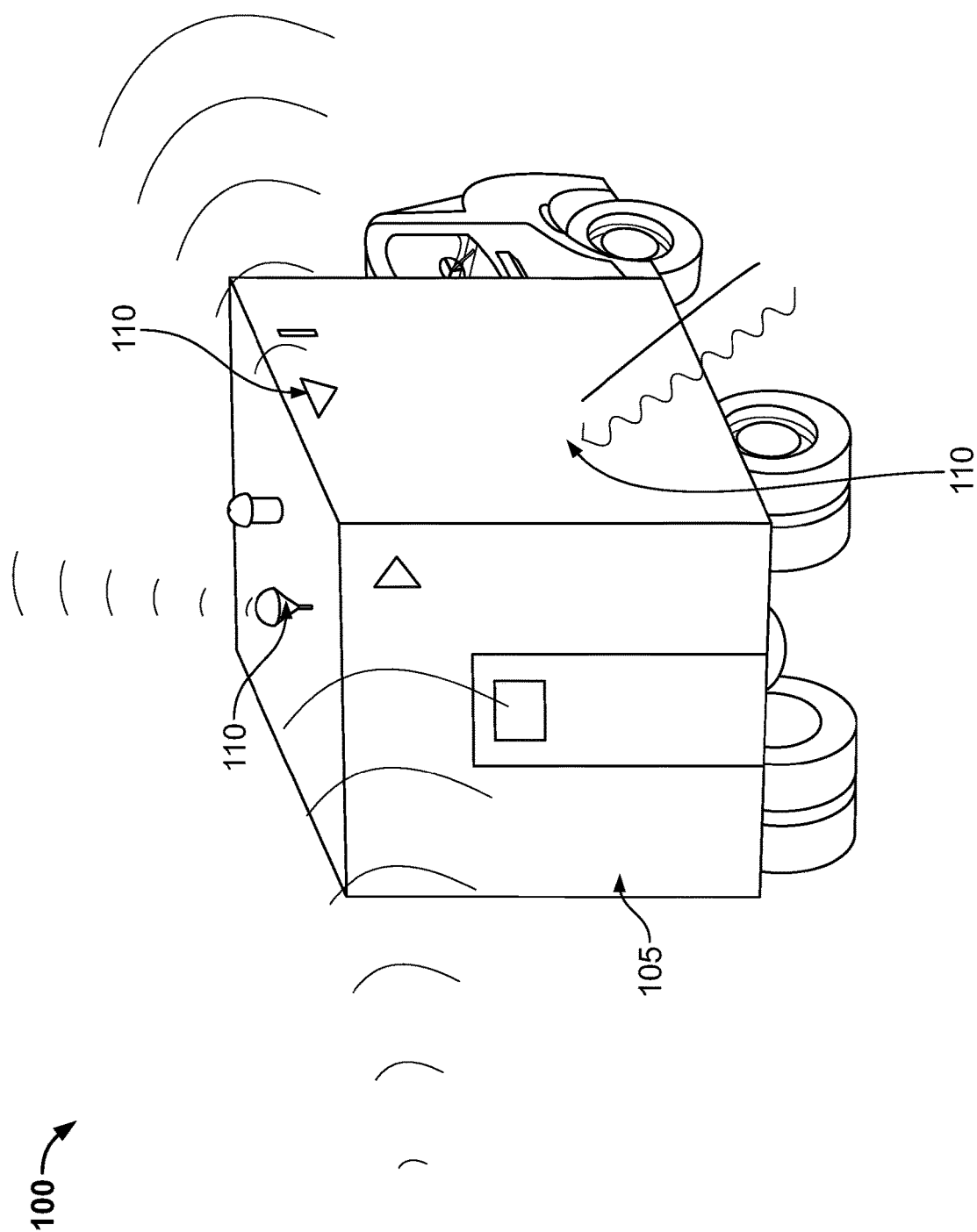
FIG. 1A is an illustration of a covert mobile inspection vehicle, in accordance with an embodiment of the present invention.

The present specification is directed towards a covert mobile inspection system, comprising a vehicle, which is equipped with a plurality of multi-modality sensors. Surveillance information from the plurality of sensors is utilized to detect and prevent subversive activities. Thus, the present specification describes a system and method for providing covert and mobile surveillance/inspection of subversive activities using a plurality of multi-modality surveillance sensors.

In addition, the present specification is directed toward using a backscatter X-ray scanning system that has improved threat detection capabilities as at least one of the plurality of surveillance sensors utilized.

Accordingly, in one embodiment, the present specification describes a covert mobile inspection vehicle having an improved on-board backscatter X-ray scanning system and further equipped with a plurality of prevention and inspection components or devices.

In one embodiment, the backscatter X-ray scanning system includes a sensor, such as a scanning laser range finder, that measures the distance of the detectors from the surface of the object under inspection.

Because it is possible to map the equivalent distance between the X-ray beam at any angle and the surface of the object by determining the relative positions of the X-ray source and the laser sensor, in one embodiment, the present specification describes an improved method of generating a radiographic image of the object under inspection, using this known distance to generate an intensity-corrected image at a given equivalent distance. The corrected image is then used to map an effective atomic number of all materials in the radiographic image. Additionally, this distance data is also used to provide an accurate geometric correction in the image to produce a true likeness of the shape of the object under inspection.

In another aspect of the improved method of generating a radiographic image of the object under inspection, adaptive region based averaging is applied (such as by using a statistical filter and/or median filter). This results in an image which has equivalent statistical properties useful in determining an accurate effective atomic number for all regions in the object under investigation. Optionally, the knowledge of effective atomic numbers and their ranges or variations is used to colour code the radiographic image.

In another embodiment, the present specification describes a method for measuring individual X-ray energies as they interact within at least one detector in order to form an analysis of the spectral content of the scattered X-ray beam.

In another embodiment, the backscatter X-ray scanning system additionally uses a multi-element scatter collimator to allow use of fan-beam X-ray irradiation to generate the backscatter image. Therefore, scattered X-rays which lie within an acceptance angle of, for example, the collimator element are detected and associated to the appropriate corresponding part of the generated radiographic X-ray image.

Apart from the X-ray scanner/sensor, the plurality of multi-modality surveillance sensors comprise any or all combinations of components such as UPS receivers, scanning lasers, CCTV cameras, infra-red cameras, audio microphones, directional RF antennas, wide-band antennas, chemical sensors, jamming devices.

In accordance with another embodiment, the present specification describes an automated detection processor for integrating and analysing all surveillance information from the plurality of sensors, in real-time, to highlight threat items for review by an operator seated inside the covert vehicle and/or remotely through a secured wireless network.

The present specification discloses multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

FIG. 1A shows a covert mobile inspection system 100 in accordance with an embodiment of the present invention. The system 100 comprises a relatively small vehicle 102, such as a van, which is equipped with a plurality of detection and prevention sensors 104 such as scanning, listening and broadcasting devices. In an embodiment, the vehicle is a 3.5 ton chassis having a height less then 3 m above road level, length ranging from 4 m to 6 m and width ranging from 2.2 m to 2.5m. In other embodiments, the vehicle may comprise small vans having a weight ranging from 1.5 T to 3.5 T. One aspect of the embodiments disclosed herein is the use of surveillance data from these multi-modality sensors in correlation and/or aggregation with data from an on-board X-ray scanning sensor. In one embodiment of the present invention, the X-ray scanning system on-board the surveillance vehicle of FIG. 1A also comprises a sensor in order to measure its distance to the scattering object, material or point.

In one embodiment, the X-ray sensor generates a backscatter radiographic image of an object from a single side utilizing Compton scattering. This allows the vehicle 105 to collect scan data, in a covert fashion, at a low dose to allow scanning of individuals, small as well as large vehicles/cargo for detection of threat devices, materials and individuals.

In another embodiment, the X-ray scanning system allows for scanning of several sides of a vehicle under inspection. For example, U.S. patent application Ser. No. 12/834,890 and Patent Cooperation Treaty (PCT) Application Number US10/41757 both entitled "Four-Sided Imaging", and filed on Jul. 12, 2010 by the Applicant of the present specification, both herein incorporated by reference in their entirety, describe [a] scanning system for the inspection of cargo, comprising: a portal defining an inspection area, said portal comprising a first vertical side, a second vertical side, a top horizontal side, and a horizontal base defined by a ramp adapted to be driven over by a vehicle; a first X-ray source disposed on at least one of the first vertical side, second vertical side or top horizontal side for generating an X-ray beam into the inspection area toward the vehicle; a first set of transmission detectors disposed within the portal for receiving the X-rays transmitted through the vehicle; a second X-ray source disposed within the ramp of said portal for generating an X-ray beam towards the underside of the vehicle; and a second set of detectors disposed within the ramp of said portal for receiving X-rays that are backscattered from the vehicle.

Figure 1B:
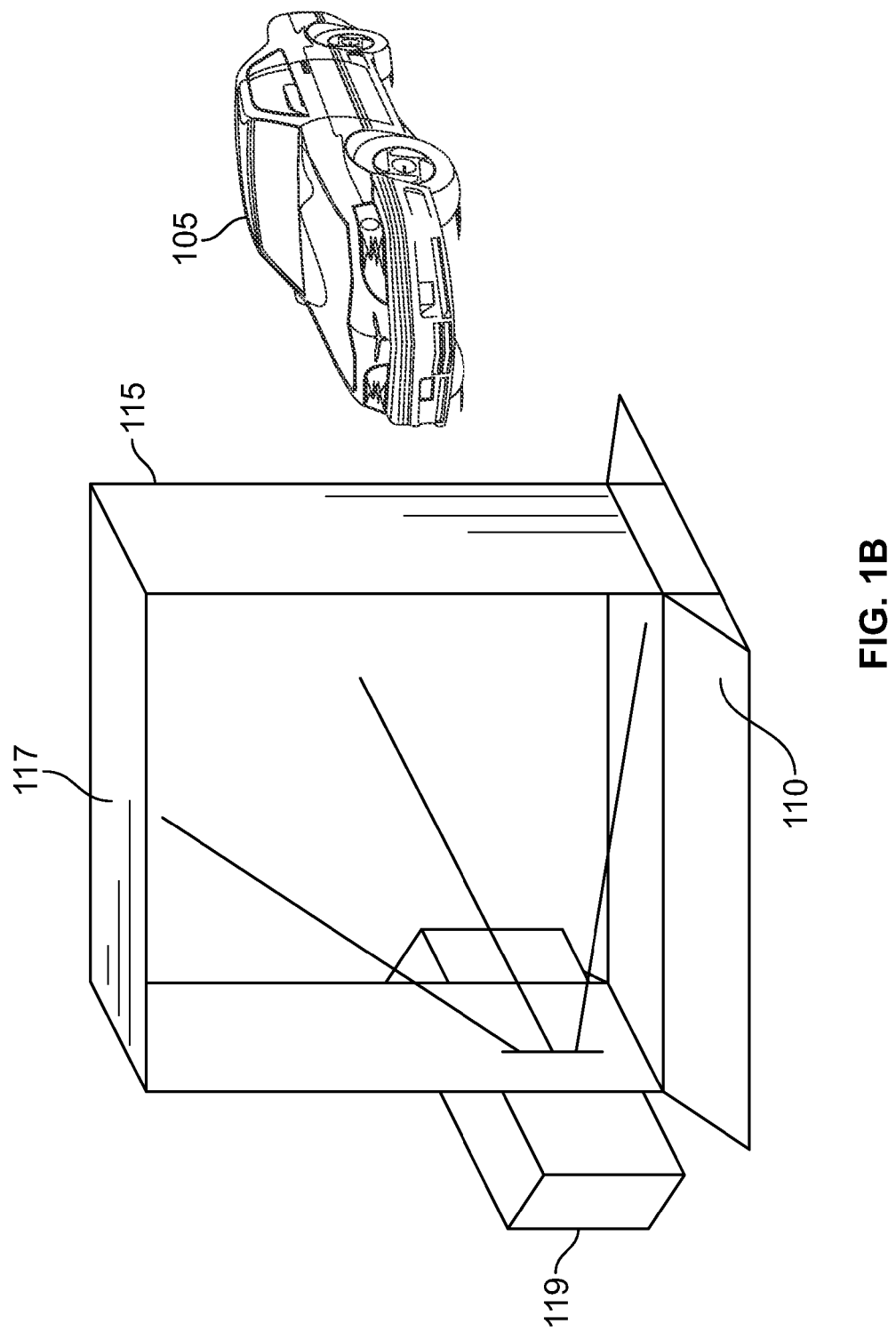
FIG. 1B is a schematic representation of one embodiment of a four-sided X-ray imaging system that may be employed in accordance with the present invention.

FIG. 1B is a schematic representation of one embodiment of the four-sided X-ray imaging system 100B disclosed in U.S. patent application Ser. No. 12/834,890 and Patent Cooperation Treaty (PCT) Application Number US10/41757. As shown in FIG. 1B, vehicle 105 drives over a ramp 110 and underneath an archway 115, which defines an inspection portal. Specifically, the portal is defined by a first (left) side, a second (right) side, a top side and a bottom platform, which is a portion of the ramp 110. In one embodiment, ramp 110 comprises a base, a first angled surface leading upward to a flat transition point defining the highest part of the ramp, which also functions as the bottom platform, and a second angled surface leading back down to the ground. The highest part of the ramp is typically between 50 and 150 mm in height. In one embodiment, archway 115 houses multiple X-ray transmission detectors 117 and at least one X-ray source 119, housed within an enclosure, shown as 220 in FIG. 2.

While FIG. 1B depicts the X-ray source 119 as being on the left side of the portal, one of ordinary skill in the art would appreciate that it could be on the right side, with an appropriate reconfiguration of the detectors 117. Preferably, the enclosure housing the X-ray is physically attached to the exterior face of the first side and is approximately 1 meter tall. The position of the enclosure depends upon the size of the inspection portal. In one embodiment, the enclosure occupies 20% to 50% of the total height of the first side. In one embodiment, a slit or opening is provided on first side, through which X-rays are emitted. Slit or opening extends substantially up first side to approximately 100% of the height. In one embodiment, slit or opening is covered with a thin coating that is substantially transparent to an X-ray. In one embodiment, the thin coating is comprises of a material such as aluminium or plastic and further provides an environmental shield.

In one embodiment, the enclosure and X-ray unit further comprise a first collimator close to the source of X-rays and a second collimator close to the exit, described in greater detail below. Where the X-ray source enclosure is so positioned, detectors 117 are positioned on the interior face of the second side and the interior face of top side and occupy the full height of second side and the full length of top side, proximate to second side.

In another embodiment, the enclosure housing the X-ray is physically attached to the exterior face of the second side and is approximately 1 meter tall. The position of the enclosure depends upon the size of the inspection portal. In one embodiment, the enclosure occupies 20% to 50% of the total height of the first side. As described above with respect to first side, if the enclosure housing the X-ray is on second side, a slit or opening is similarly provided on second side. The detectors are also similarly positioned on the interior faces of top side and first side when the enclosure is on second side. In one embodiment, with a dual-view system, an enclosure housing an X-ray source can be provided on both the first side and second side.

Figure 1C:
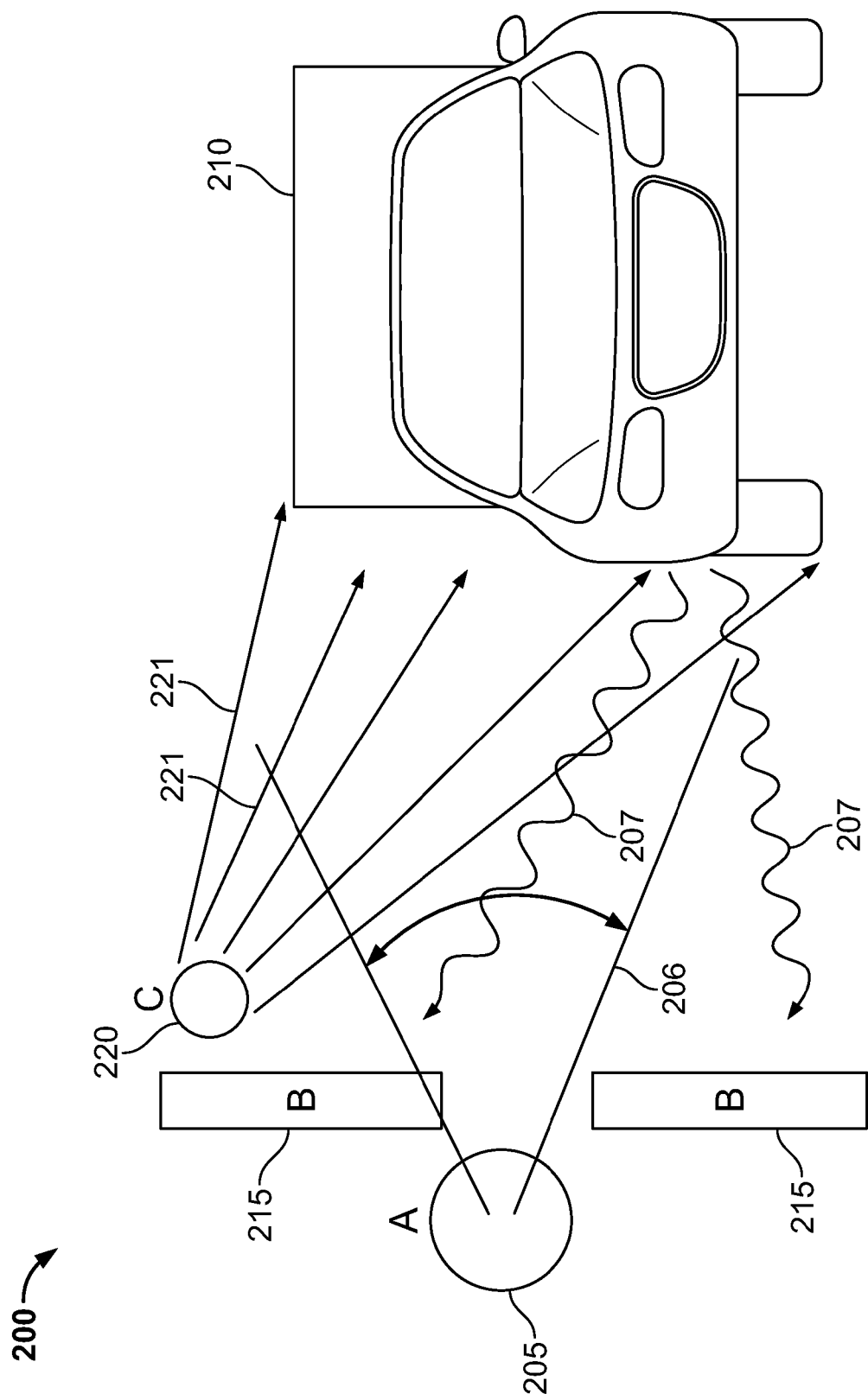
FIG. 1C is an illustration of an embodiment of the X-ray scanning system on-board the surveillance vehicle of FIG. 1A in accordance with one embodiment of the present invention.

As shown in FIG. 1C, the X-ray scanning system 200 comprises an X-ray source 205 collimated by a rotating disk with a small aperture which allows X-rays to scan in at least one pencil beam 206, and preferably a series of "moving" pencil beams. within a substantially vertical plane from the X-ray source 205 to the object 210. X-rays 207 scatter back from the object 210 under inspection and some of these reach at least one detector array 215 located adjacent to the X-ray source 205 but outside the plane described by the moving X-ray beam 206. The intensity of the backscatter signal 207 is representative of the product of distance to the object and atomic number of the object.

Persons of ordinary in the art would appreciate that the signal size due to Compton scattering from objects varies as the inverse fourth power of distance between the X-ray source and the scattering object. It is also known to persons of ordinary skill in the art that low atomic number materials are less efficient at scattering X-rays than high atomic number materials while high atomic number materials are more efficient at absorbing X-rays of a given energy than low atomic number materials. Therefore, the net result is that more X-rays having a greater intensity are scattered from low atomic number materials than from high atomic number materials. However, this effect varies approximately linearly with atomic number while the X-ray signal varies as the inverse fourth power of distance from the source to the scattering object. This also implies that known Compton scatter based radiographic images are essentially binary in nature (scattering or not scattering) since the small but quantitative variation of the signal size due to variation in atomic number is lost in the gross variation in signal intensity caused due to varying distances from X-ray source to scattering points.

To correct for distance, a sensor 220 is provided (adjacent to the X-ray source and detectors) which is capable of detecting the distance to each point at the surface of the object 210. In one embodiment, the sensor 220 is advantageously a scanning laser range finder in which a beam of infra-red light 221 is scattered from the surface of the object 210 and the time taken for the pulsed beam to return to the sensor 220 is indicative of the distance to the surface of the object 210. For example, U.S. patent application Ser. No. 12/959,356 and Patent Cooperation Treaty Application Number US10/58809, also by the Applicant of the present specification, entitled "Time of Flight Backscatter Imaging System" and filed on Dec. 22, 2010, both of which are herein incorporated by reference in their entirety, describes a method in which the time of flight of the X-ray beam to and from the surface of the object under inspection is used to determine the distance between the source and scattering object.

One of ordinary skill in the art would note that the distances between the surface of the object and the planar detector arrays are variable, since the object is not straight sided. Further, since the distance from the X-ray source to the object under inspection is not known in general, an assumption is generally made that the object is planar and at a fixed distance from the source. Thus, if the object is closer than assumed, then the object will appear smaller in the image and conversely, if the object is further away then it will appear to be larger. The result is an image which is representative or the object under inspection but not with correct geometry. This makes it difficult to identify the precise location of a threat or illicit object within the object under inspection.

U.S. patent application Ser. No. 12/959,356 and Patent Cooperation Treaty Application Number US10/58809 address the above problem by integrating time of flight processing into conventional backscatter imaging. X-rays travel at a constant speed which is equal to the speed of light ($3 \times 10^8$ m/s). An X-ray will therefore travel a distance of 1 m in 3.3 ns or equivalently, in 1 ns ($10^{-9}$ s) an X-ray will travel 0.3 m. Thus, if the distance between a backscatter source and the object under inspection is on the order of 1 m, it corresponds to around 3 ns of transit time. Similarly, if the backscatter X-ray detector is also located around 1 m from the surface of the object, it corresponds to an additional 3 ns of transit time. Thus, the signal received at the detector should be received, in this example, 6 ns after the X-ray beam started its transit from the X-ray tube. In sum, the X-ray's transit time is directly related to the detectors' distance to or from the object. Such times, although quite short, can be measured using detection circuits known to those of ordinary skill in the art.

The minimum distance is practically associated with the time resolution of the system. Objects can be proximate to the source, but one will not see much scattered signal since the scatter will generally be directed back to the X-ray source rather than to a detector. A practical lower limit, or the minimum distance between the plane of the system and the nearest part of the object to be inspected, is 100 mm. The further away the object is from the detector, the smaller the signal size and thus a practical upper limit for distance is of the order of 5 m.

Figure 2A:
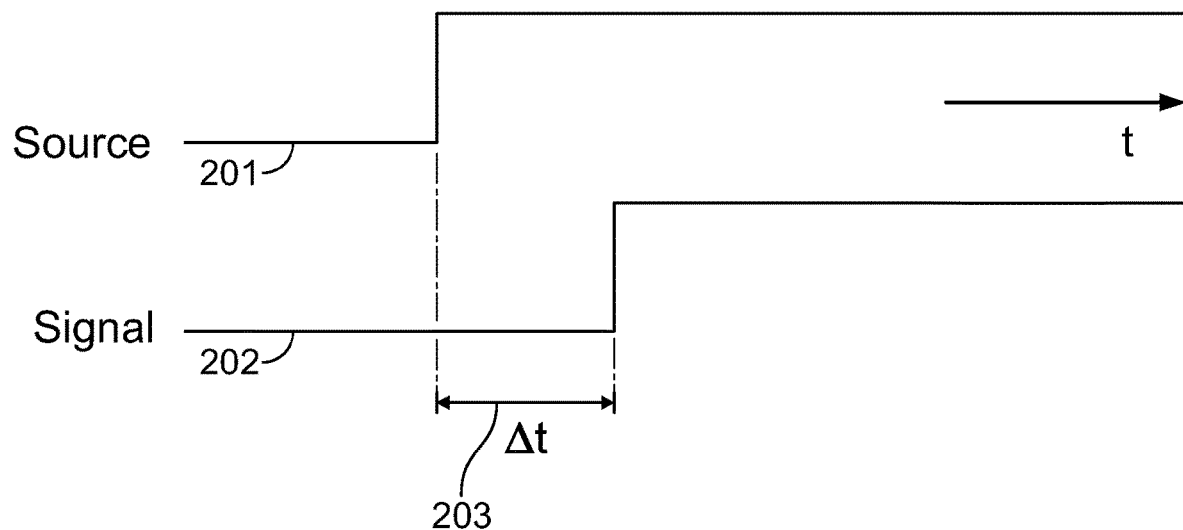
FIG. 2A depicts a representation, as a step function, of an X-ray source being switched rapidly from its beam-off condition to its beam-on condition, that may be employed in accordance with the present invention.
Figure 2B:
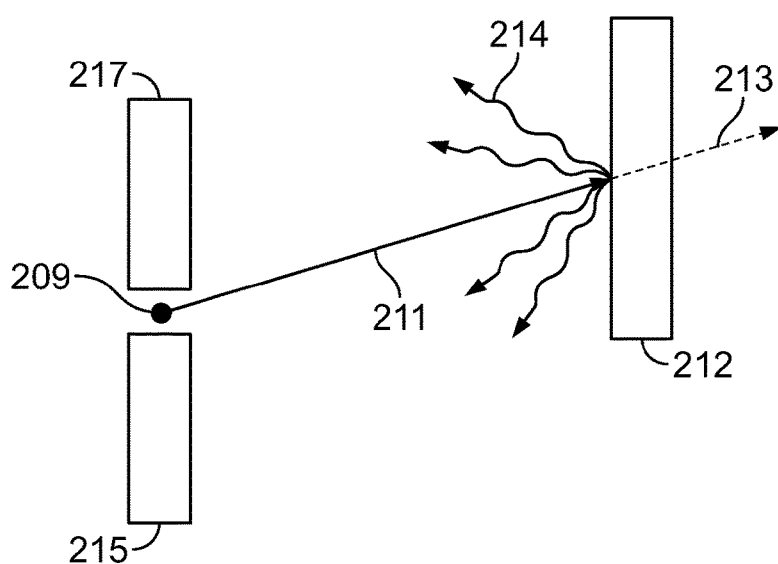
FIG. 2B diagrammatically illustrates an operation of time of flight backscatter imaging, that may be employed in accordance with the present invention.

In the systems of the present application, as shown diagrammatically in FIGS. 2A and 2B, the distance between the X-ray source and the object under inspection is determined precisely by recording the time taken for an X-ray to leave the source and reach the detector. FIG. 2A depicts a representation, as a step function, of an X-ray source being switched rapidly from its beam-off condition to its beam-on condition. While 201 represents the step function at the source, 202 represents the detector's response. Thus, as can be seen from 201 and 202, after the beam is switched on from its off state at the source, the detector responds with a step-function like response after a time delay Δt 203. Referring to FIG. 2B, as the source 209 emits a pencil beam 211 of X-rays towards the object 212, some of the X-rays 213 transmit into the object 212, while some X-rays 214 back-scatter towards the detectors 217.

It may be noted that there are different path lengths from the X-ray interaction point (with the object) to the X-ray detector array. Therefore if a large detector is used, there will be a blurring to the start of the step pulse at the detector, where the leading edge of the start of the pulse will be due to signal from the part of the detector which is nearest to the interaction spot, and the trailing edge of the start of the pulse will be due to signal from parts of the detector which are further away from the interaction spot. A practical system can mitigate such temporal blurring of by segmenting the detector such that each detector sees only a small blurring and the changes in response time each provide further enhancement in localisation of the precise interaction position, hence improving the determination of the surface profile of the object under inspection.

The detector size (minimum and/or maximum) that would avoid such blurring effects described above is commensurate with the time resolution of the system. Thus, a system with 0.1 ns time resolution has detectors of the order of 50 mm in size. A system with 1 ns time resolution has detectors of the order of 500 mm in size. Of course, smaller detectors can be used to improve statistical accuracy in the time measurement, but at the expense of reduced numbers of X-ray photons in the intensity signal, so there is a trade-off in a practical system design which is generally constrained by the product of source brightness and scanning collimator diameter.

Figure 3C:
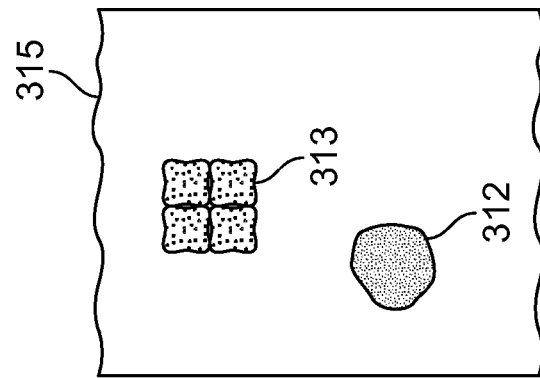
FIG. 3C depicts a backscatter radiographic quantitative image scaled by effective atomic number, in accordance with an embodiment of the present invention.

Referring to FIG. 1C, it should be appreciated that knowing the relative positions of the X-ray source 205 and the laser sensor 220 the equivalent distance between the X-ray beam 206 at any angle and the surface of the object 210 is mapped using a geometric look up table (for computational efficiency). This known distance is then used to apply an intensity correction to the measured X-ray scatter data to produce a radiographic image at a given equivalent distance of, say, 1 m. Thus, objects that are closer than 1 m will have their intensity reduced by a factor of $1/(1-\text{distance})^4$ while objects farther away than 1 m will have their intensity increased by a factor of $1/(1-\text{distance})^4$. The quantitatively corrected image so produced is then used to map an effective atomic number of all materials in the radiographic image, as shown in FIGS. 3A through 3C.

Figure 3B:
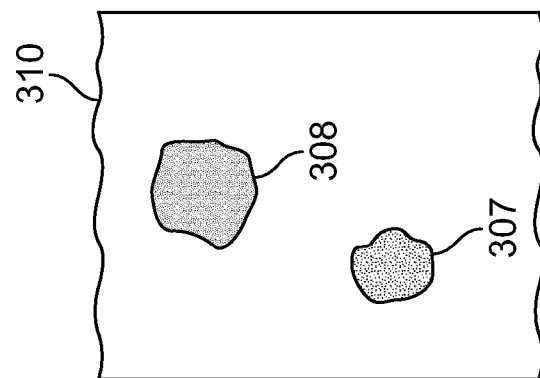
FIG. 3B depicts a backscatter radiographic image where intensity of object images has been scaled for distance, in accordance with an embodiment of the present invention.
Figure 3A:
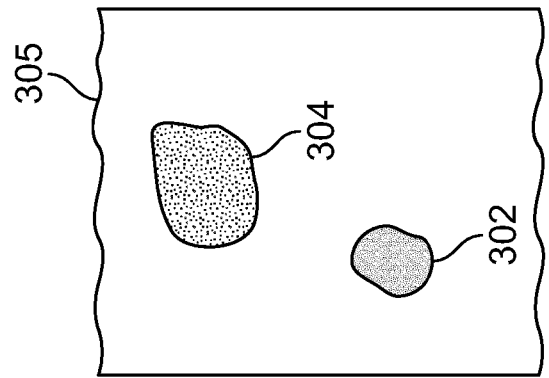
FIG. 3A depicts a backscatter radiographic image without using intensity or effective atomic number scaling.

As shown in FIG. 3A, radiographic image 305 represents an image of two objects obtained using an X-ray scanning system without intensity or effective atomic number scaling, the lower one 302 being close to the X-ray source and the upper one 304 being farther away from the source. The lower object 302 is shown to be bright while the upper image 304 is seen to be faint.

Referring now to FIG. 3B, image 310 shows the result of scaling intensity for distance where the lower object 307 is now lighter than in image 305 while the upper object 308 is now brighter than the lower object 307. This suggests that the upper object 308 is of lower atomic number than the lower object 307. This is in contrast to the original image 305, wherein the relative atomic numbers are typically prone to misrepresentation.

In accordance with another aspect of the present application, it is recognized that signal scattered due to objects farther from the X-ray source have poorer signal-to-noise ratio than signal from scattering objects closer to the source. This implies that the distance measurement can be further utilized to implement an adaptive region based averaging method whereby signal from regions far from the source are averaged over a larger region, such that the linear dimension of these regions is scaled as the square of the distance from source to object. This effect is shown in image 315 of FIG. 3C. In FIG. 3C, the upper object 313 has been averaged over larger regions than the lower object 312 thereby resulting in equivalent statistical properties useful in determining an accurate effective atomic number for all regions in the object under investigation. In a preferred embodiment, the adaptive region averaging method is implemented using a statistical filter to determine if a given pixel is likely to be a part of the main scattering object, or part of an adjacent object in which this value should not be used to compute the region average.

In one embodiment, a suitable statistical filter lists all pixel values within a region (for example a 7×7 block), ranks them in order and then determines the mean value and standard deviation of the central range of values. Any pixel within the whole block whose intensity is more than 2 standard deviations from the mean value within that block is considered to be part of an adjacent object. A range of statistical filters can be developed which may use higher order statistical attributes, such as skewness, to refine the analysis. Alternate methods, such as median filtering, which can mitigate against boundary effects between image features are well known to persons of ordinary skill and all such methods can be suitably applied within the scope of the present invention.

In accordance with yet another aspect described in the present specification, in one embodiment, the individual pixels in image 310 are colored according to the values in the quantitative image 315 scaled by effective atomic number. Here, the distance normalized pixels are colored on an individual basis (to ensure a sharp looking image) based on results from the region averaged image 315 with improved statistics. Alternative schemes can also be used for pixel coloring. For example, pixels with effective atomic number below 10 are colored orange (corresponding to organic materials such as explosives), pixels with effective atomic numbers between 10 and 20 are colored green (corresponding to low atomic number inorganic materials such as narcotics) while materials with effective atomic numbers greater than 20, such as steel, are colored blue. Still alternatively, a rainbow spectrum can be used in, which pixel colored changes from red through yellow, green and blue as effective atomic number increases. Many other color tables can be selected depending on preference and application.

In accordance with further aspect of the present specification, it is recognized that the beam from the X-ray source is diverging from a point which is generally located at least one meter from ground level. This implies that the raw image 305 is actually distorted—with regions at the centre of the image being unnaturally wide compared to regions at the top and bottom of the image which are unnaturally narrow. In conventional methods, a geometric correction is applied according to a cosine-like function which makes the assumption of a flat sided object at a fixed distance from the source. In contrast, in an embodiment of the present invention, the distance data from the scanning laser sensor 220 of FIG. 1C is used to provide an accurate geometric correction to produce a true likeness of the shape of the object under inspection.

Figure 4:
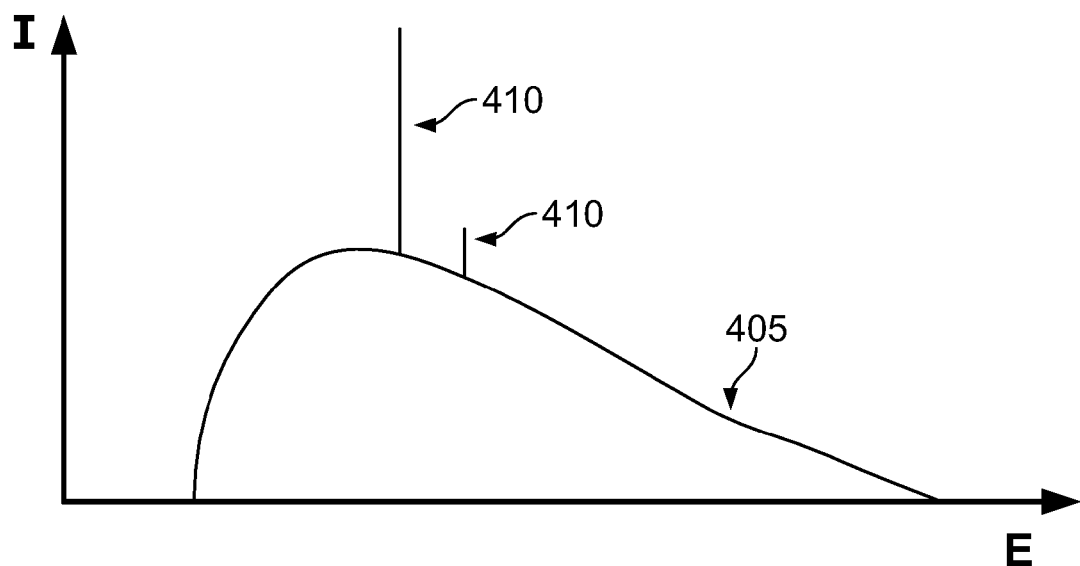
FIG. 4 is a graphical representation of a Bremsstrahlung spectrum with a typical tungsten anode X-ray tube.

The present invention also lays focus on spectral composition of the X-ray beam that is incident on the object under inspection. Accordingly, in one embodiment it is advantageous to create the X-ray beam using an X-ray tube with cathode-anode potential difference in the range 160 kV to 320 kV with tube current in the range of 1 mA to 50 mA depending on allowable dose to the object under inspection and weight and power budget for the final system configuration. Regardless of tube voltage and current, a broad spectrum of X-ray energies is produced as shown in FIG. 4. Here, a broad Bremsstrahlung spectrum 405 is visible complimented by fluorescence peaks 410 at 60 keV with a typical tungsten anode tube.

Figure 5:
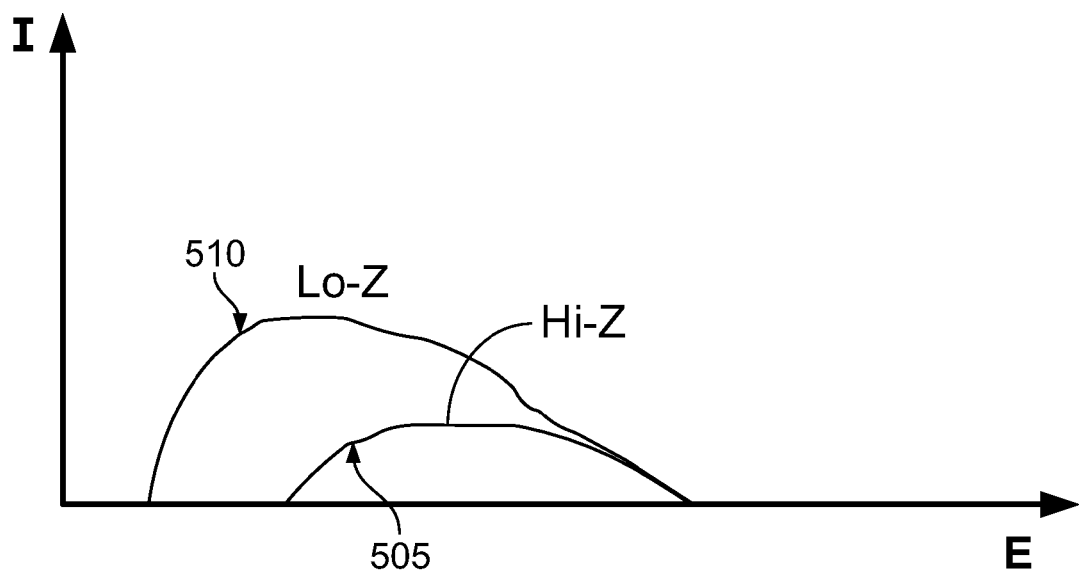
FIG. 5 is a graphical representation of a high mean energy spectrum for high Z materials and a low mean energy spectrum for lower Z materials, in accordance with an embodiment of the present invention.

It should be noted that as a result of Compton scattering, the X-rays backscattered towards the detectors are generally of lower energy than those interacting in the object itself, and so the scattered beam hits a lower mean energy than the incident beam. Further, the impact of the scattering object is to preferentially filter the X-ray beam—removing more and more of the lower energy components of the beam the higher the effective atomic number of the scattering object. This phenomenon is shown in FIG. 5 where a high atomic number (Z) material represents higher mean energy spectrum 505 while a lower atomic number (Z) material is represented by the relatively lower mean energy spectrum 510, thereby enabling discerning of low Z items from relatively high Z items.

Referring back to FIG. 1C, the detectors 215 measure the energy of the X-rays 207 that arrive at the detectors 215 after being scattered by the object 210. In one embodiment, each detector 215 comprises an inorganic scintillation detector such as NaI(TI) or an organic scintillator such as polyvinyl toluene coupled directly to one or more light sensitive readout devices such as a photomultiplier tube or a photo-diode. In an alternate embodiment, the detectors comprise semiconductor sensors such as semiconductors having a wide bandgap including, but not limited to, CdTe, CdZnTe or HgI which can operate at room temperature; or semiconductors having a narrow bandgap such as, but not limited to, HPGe which needs to be operated at low temperatures. Regardless of the detector configuration chosen, the objective is to measure individual X-ray energies as they interact in the detector in order to form an analysis of the spectral content of the scattered X-ray beam 207.

Persons of ordinary skill in the art would appreciate that the data acquisition module (typically comprising detectors, photomultipliers/photodiodes and analog-to-digital converter circuitry and well known to persons skilled in the art) will be synchronized to the position of the primary X-ray bean 206 in order to collect one spectrum for each interacting X-ray source point. For example, the X-ray system 200 may be configured to collect 300 lines per second with 600 pixels per image line. In this case, the equivalent dwell time of the primary X-ray beam at each source point is $\frac{1}{180000}$ sec-5.5 μs per point and the detectors need to be capable of recording several hundred X-rays during this time. To achieve the necessary count rates, one embodiment uses a small number of fast responding detectors (such as polyvinyl toluene plastic scintillators with photomultiplier readout) or a larger number of slow responding detectors (such as NaI scintillators with photomultiplier readout), depending upon factors such as cost and complexity.

Given the acquisition of the X-ray spectrum at each sample point and the phenomena described with reference to FIGS. 4 and 5, it would be evident to those of ordinary skill in the art that the statistical properties of the X-ray spectrum can provide additional information on the effective atomic number of the scattering material at each primary beam interaction site. Using the known distance information, the area of the spectrum may be corrected to yield an improved quantitative result (as discussed earlier), while properties such as mean energy, peak energy and skewness or the spectrum provide the quantitative parameters that are required for accurate materials analysis.

As an example, a scattering object far from the detector will produce a naturally faint signal, with the displayed brightness of this object being corrected through the use of known distance information, such as that provided by a scanning laser. Given that the signal for the region is formed from a limited number of scattered X-ray photons, the properties of the signal can be described using Gaussian statistics. Gain correction to account for distance from the source is applied in a linear fashion, and so the region still maintains its original statistical properties even though its mean value has been scaled to a larger value.

Figure 7:
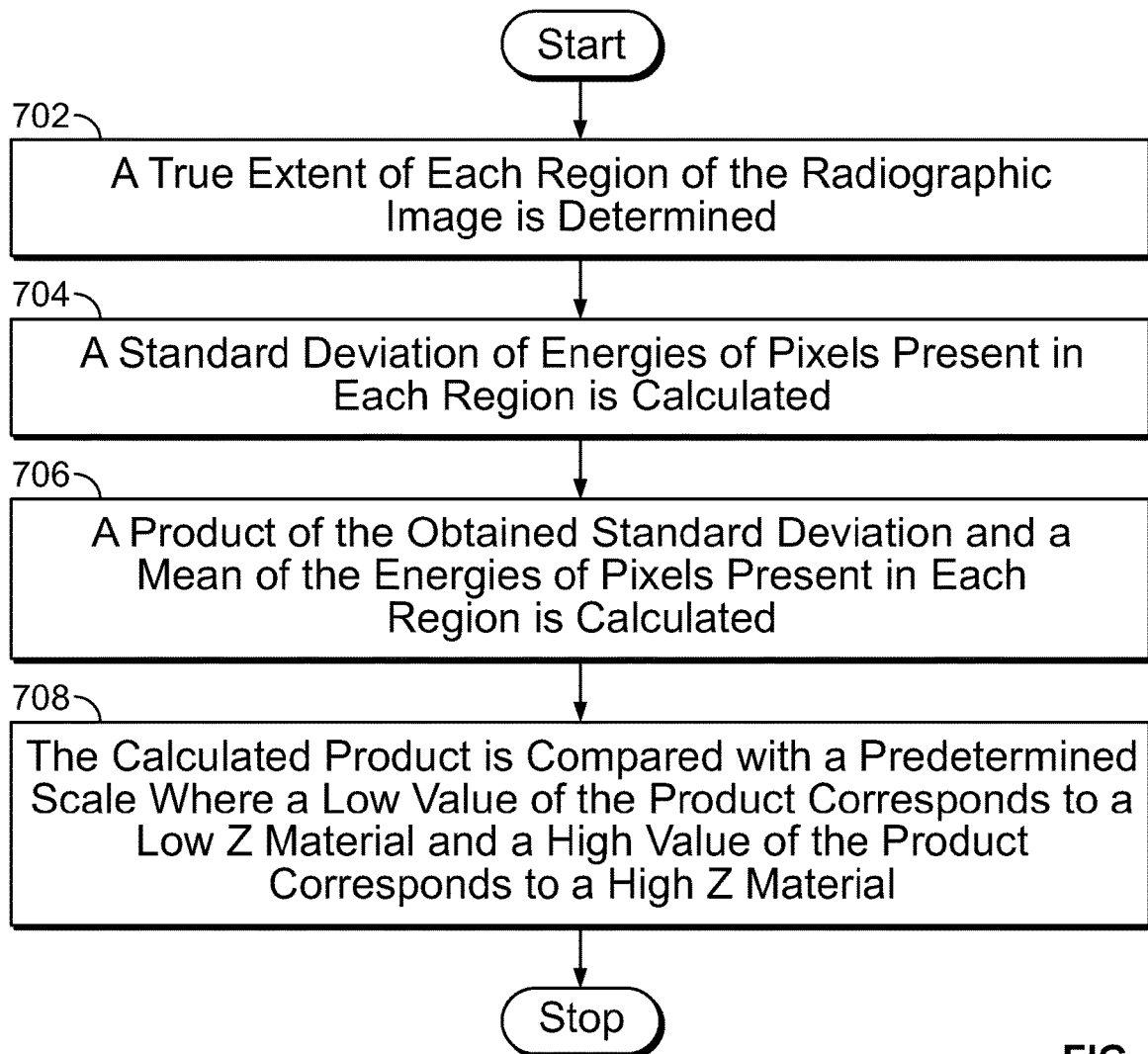
FIG. 7 is a flowchart illustrating a method of obtaining an atomic number of each material contained in an object being scanned by the covert mobile inspection vehicle of the present invention.

As identified in FIG. 5, the spectral composition of the scattered beam dependent on effective atomic number of the scattering material. FIG. 7 is a flowchart illustrating a method of obtaining an atomic number of each material contained in an object being scanned by the covert mobile inspection vehicle of the present invention. At step 702, a true extent of each region of the radiographic image is obtained by using a suitable statistical filter as described earlier. A true extent of a region enables determining a boundary of each constituent material. Thus, the true extent refers to the physical area over which the object extends. It is desirable to find the point at which one object finishes and at which the next object begins so that only pixels for the current object are used in quantitative imaging, without the effects of contamination from adjacent objects. At step 704, a mean energy of each detected signal is calculated along with a standard deviation and skewness of energies of pixels present in each region. At step 706, a product of the calculated standard deviation and a mean energy of the pixels energies of pixels present in each region is calculated. At step 708, the calculated product is compared with a pre-determined scale where a low value of the product corresponds to a low atomic number material and a high value of the product corresponds to a high atomic number material.

Figure 6:
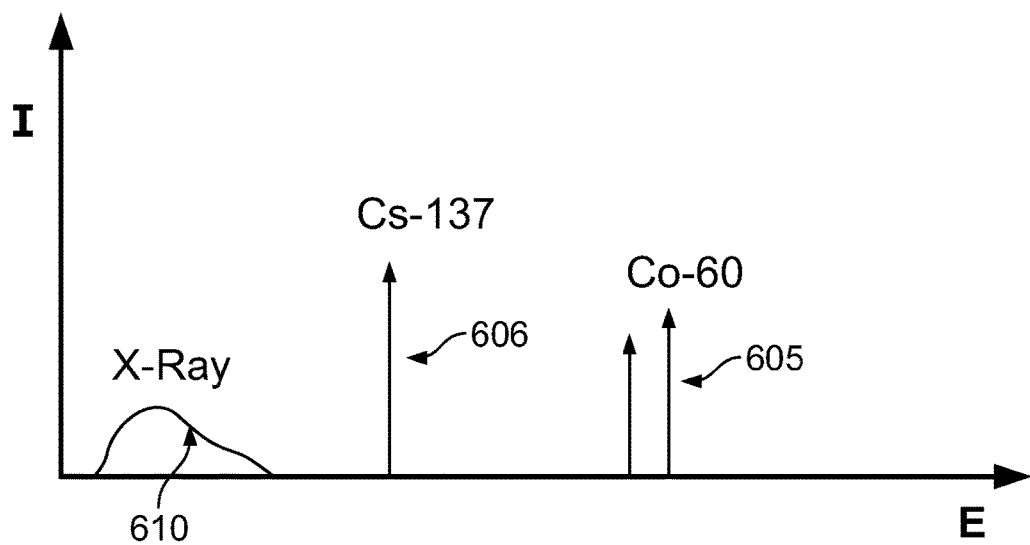
FIG. 6 is a graphical representation of a gamma ray spectrum with higher energies as compared with X-rays, in accordance with an embodiment of the present invention.

Further, it should be appreciated that the X-ray scatter data is generally at low energy and often below 100 keV in magnitude. In contrast, gamma-rays from radioactive sources, that may be present in the object under inspection, will typically be at much higher energy (for example Co-60 has gamma-rays at 1.1 and 1.3 MeV while Cs-137 emits gamma rays at 662 keV). As shown in FIG. 6, it is therefore possible to discriminate these high energy gamma rays, represented by spectrums 605 and 606, from the low energy scattered X-rays 610 thereby allowing simultaneous acquisition of active X-ray backscatter signals along with passive gamma-ray detection in accordance with an aspect of the present invention.

U.S. patent application Ser. No. 12/976,861, also by the Applicant of the present invention, entitled "Composite Gamma Neutron Detection System" and filed on Dec. 22, 2010, describes a method for simultaneous detection of gamma-rays and neutrons with pulse shape discrimination to discriminate between the two effects. This method is also applicable to the current invention and is incorporated herein by reference.

As described in U.S. patent application Ser. No. 12/976,861, several nuclei have a high cross-section for detection of thermal neutrons. These nuclei include He, Gd, Cd and two particularly high cross-section nuclei: Li-6 and B-10. In each case, after the interaction of a high cross-section nucleus with a thermal neutron, the result is an energetic ion and a secondary energetic charged particle.

For example, the interaction of a neutron with a B-10 nucleus can be characterized by the following equation:

$$n+\text{B-}10 \rightarrow \text{Li-}7-\text{He-}4(945 \text{ barns}, Q=4.79 \text{ MeV}) \quad \text{Equation 1:}$$

Here, the cross section and the Q value, which is the energy released by the reaction, are shown in parenthesis.

Similarly, the interaction of a neutron with a Li-6 nucleus is characterized by the following equation:

$$n+\text{Li-}6 \rightarrow \text{H-}1 \text{ H-}3-\text{He-}4(3840 \text{ barn}, Q=2.79 \text{ MeV}) \quad \text{Equation 2}$$

It is known that charged particles and heavy ions have a short range in condensed matter, generally travelling only a few microns from the point of interaction. Therefore, there is a high rate of energy deposition around the point of interaction. In the present invention, molecules containing nuclei with a high neutron cross section are mixed with molecules that provide a scintillation response when excited by the deposition of energy. Thus, neutron interaction with Li-6 or B-10, for example, results in the emission of a flash of light when intermixed with a scintillation material. If this light is transported via a medium to a photodetector, it is then possible to convert the optical signal to an electronic signal, where that electronic signal is representative oldie amount of energy deposited during the neutron interaction.

Further, materials such as Cd, Gd and other materials having a high thermal capture cross section with no emission of heavy particles produce low energy internal conversion electrons, Auger electrons, X-rays, and gamma rays ranging in energy from a few keV to several MeV emitted at substantially the same time. Therefore, a layer of these materials, either when mixed in a scintillator base or when manufactured in a scintillator, such as Gadolinium Oxysulfide (GOS) or Cadmium Tungstate (CWO) will produce light (probably less than heavier particles). GOS typically comes with two activators, resulting in slow (on the order of 1 ms) and fast (on the order of 5 µs) decays. CWO has a relatively fast decay constant. Depending on the overall energy, a significant portion of the energy will be deposited in the layer, while some of the electrons will deposit the energy in the surrounding scintillator. In addition, the copious X-rays and gamma rays produced following thermal capture will interact in the surrounding scintillator. Thus, neutron interactions will result in events with both slow and fast decay constants. In many cases, neutron signals will consist of a signal with both slow and fast components (referred to as "coincidence") due to electron interfacing in the layer and gamma rays interacting in the surrounding scintillator.

The scintillation response of the material that surrounds the Li-6 or B-10 nuclei can be tuned such that this light can be transported through a second scintillator, such as a plastic scintillator in one embodiment, with a characteristic which is selected to respond to gamma radiation only. In another embodiment, the material that surrounds the Li-6 or B-10 is not a scintillator, but a transparent non-scintillating plastic resulting in a detector that is only sensitive to neutrons.

Thus, the plastic scintillator is both neutron and gamma sensitive. When a neutron is thermalized and subsequently captured by the H in the detector, a 2.22 MeV gamma ray is also emitted and often detected. In this manner, the invention disclosed in U.S. patent application Ser. No. 12/976,861 achieves a composite gamma-neutron detector capable of detecting neutrons as well as gamma radiation with high sensitivity. Further, the composite detector also provides an excellent separation of the gamma and neutron signatures. It should be noted herein that in addition to charged particles, B-10 produces gamma rays. Therefore, in using materials that produce gamma rays following neutron capture, the result may be a detection that looks like gamma rays. Most applications, however, want to detect neutrons; thus, the disclosed detector is advantageous in that it also detects the neutrons.

Figure 8:
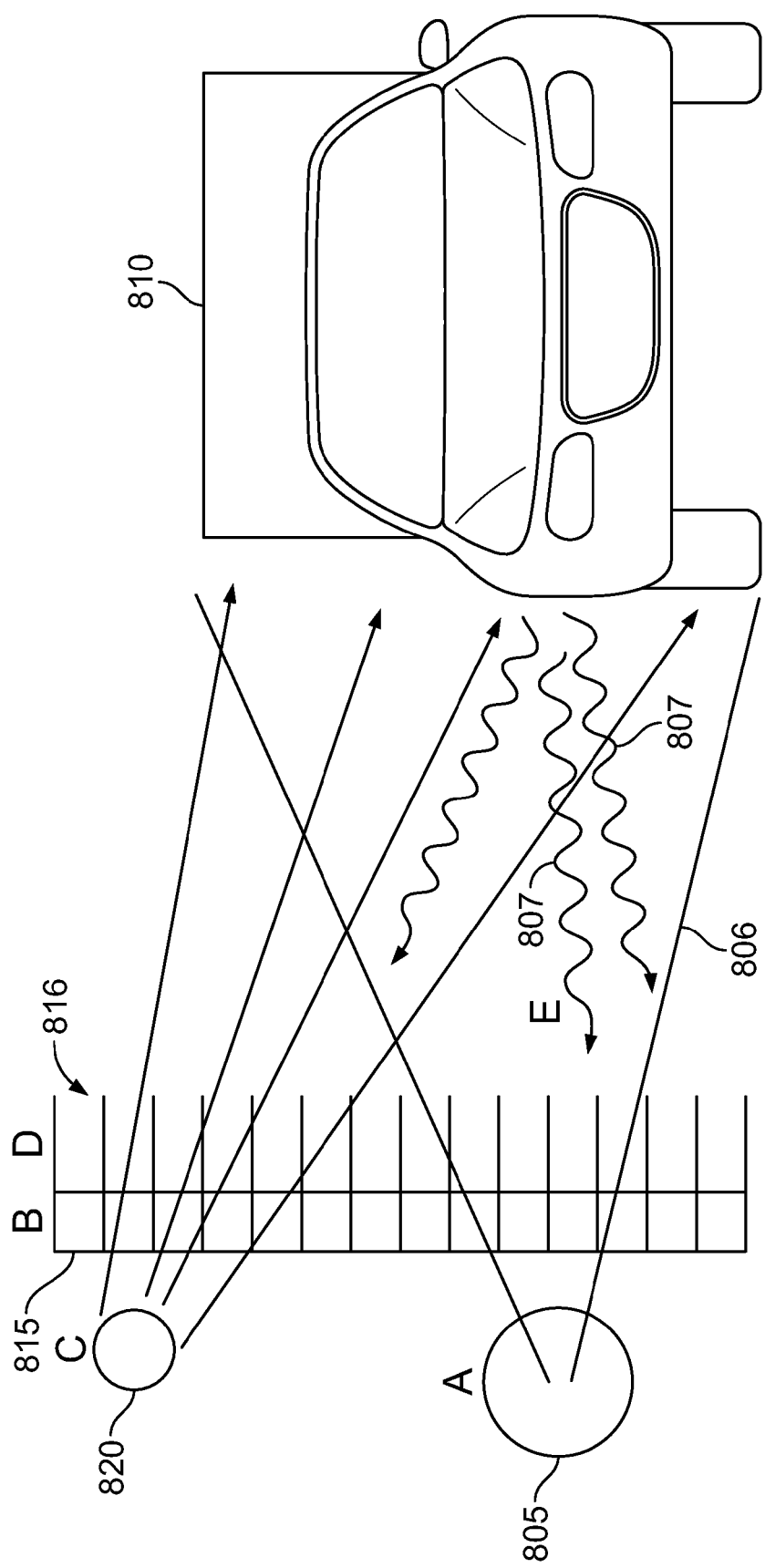
FIG. 8 is an illustration of another embodiment of the covert mobile inspection vehicle, shown in FIG. 1, further illustrating an on-board X-ray scanning system.

FIG. 8 shows another embodiment of the X-ray scanning system 800 of the present invention that additionally uses a multi-element scatter collimator 816 to allow use of fan-beam X-ray irradiation to generate the backscatter image. Here, the X-ray source 805 emits a fan beam 806 of radiation towards the object 110. A segmented detector array 815 is located behind a multi-element collimator 816, one detector element per collimator section. The collimator 816 is designed to permit X-rays to enter from a narrow angular range, typically less than +/−2 degrees to the perpendicular to the detector array 815. X-rays 807 scattering from various points in the object 810 which lie within the acceptance angle of, for example, the collimator element 816 are detected and associated to the appropriate corresponding part of the generated radiographic X-ray image. Again, a sensor 820 is provided to measure distance to the surface of the object 810 in order to correct the X-ray backscatter signal and produce a quantitative image scaled by effective atomic number. U.S. patent application Ser. No. 12/993,831, also by Applicant of the present invention, entitled "High-Energy X-Ray Inspection System Using A Fan-Shaped Beam and Collimated Backscatter Detectors", and filed on Nov. 19, 2010, discloses use of such a multi-element scatter collimator and is hereby incorporated by reference in its entirety.

Figure 9:
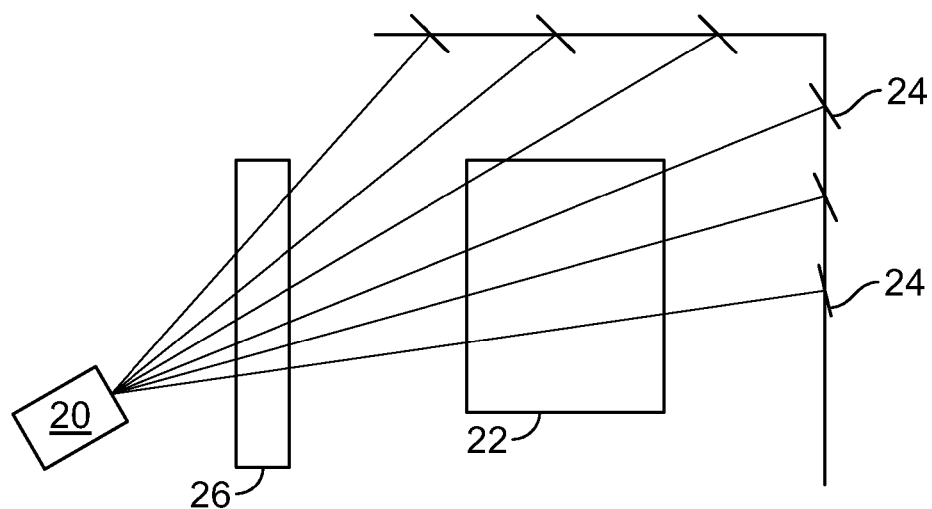
FIG. 9 is a schematic representation of components of a scanning system that may be employed in accordance with the present invention.

A system configuration according to an embodiment of the invention disclosed in U.S. patent application Ser. No. 12/993,831 is outlined in FIGS. 9 to 11. Here, an X-ray linear accelerator 20 is used to fire a collimated fan-beam of high energy (at least 900 keV) X-radiation through an object 22 under inspection and to a set of X-ray detectors 24 which can be used to form a high resolution transmission X-ray imaging of the item under inspection. The X-ray linear accelerator beam is pulsed, so that as the object under inspection moves through the beam, the set of one-dimensional projections can be acquired and subsequently stacked together to form a two-dimensional image.

Figure 10:
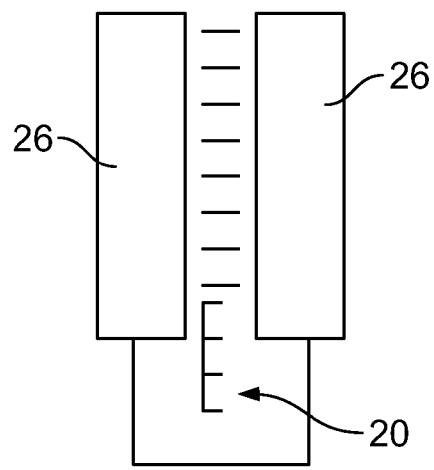
FIG. 10 is a schematic representation of components of a scanning system that may be employed in accordance with the present invention.

In this embodiment, an X-ray backscatter detector 26 is placed close to the edge of the inspection region on the same side as the X-ray linear accelerator 20 but offset to one side of the X-ray beam so that it does not attenuate the transmission X-ray beam itself. As shown in FIG. 10, it is advantageous to use two backscatter imaging detectors 26, one on either side of the primary beam. In some embodiments the backscatter detectors may be arranged differently. In some embodiments there may be only one backscatter detector. In other embodiments there may be more than two such detectors.

In contrast to known backscatter imaging detectors which use the localisation of the incident X-ray beam to define the scattering region, the backscatter imaging detector described, is able to spatially correlate the intensity of backscattered X-ray signals with their point of origin regardless of the extended fan-beam shape of the X-ray beam.

Figure 11:
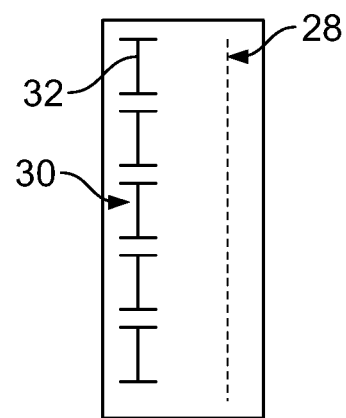
FIG. 11 is a schematic representation of components of a scanning system that may be employed in accordance with the present invention.

In the backscatter imaging detector 26, this spatial mapping is performed using a segmented collimator 28 in zone plate configuration as shown schematically in FIG. 11. Normally, a zone plate will comprise a series of sharply defined patterns whose impulse response function is well known in the plane of a two-dimensional imaging sensor that is located behind the sensor. In the present case, the energy of the X-ray beam to be detected is typically in the range 10 keV to 250 keV and so the edges of the zone plate pattern will not be sharp. For example, a zone plate fabricated using lead will require material of thickness typically 2 mm to 5 mm. Further, it is expensive to fabricate a high resolution two-dimensional imaging sensor of the size that is required in this application.

Figure 12:
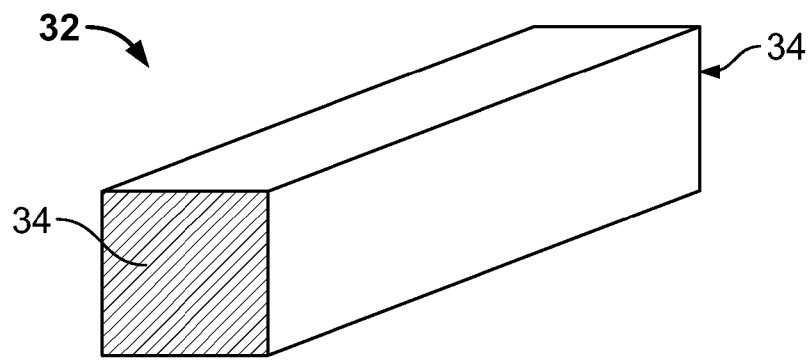
FIG. 12 shows a schematic view of a detector element that may be employed in accordance with the present invention.

However, it is noted that the radiation beam is well collimated in one direction (the width of the radiation fan beam) and therefore the imaging problem is reduced to a one-dimensional rather than a two-dimensional problem. Therefore a backscatter detector in the form of an effectively one dimensional imaging sensor 30 is provided behind the zone plate 28. To address this problem an elemental backscatter detector is used in this embodiment. As shown in FIG. 11, the detector 30 comprises a plurality of detector elements 32. FIG. 12 illustrates a detector element 32 suitable for use in this example. Here, the detector element 32 comprises a bar of scintillation material (about 100 mm long in this example) and is supplied with a photo-detector 34 at either end. The photo-detector 34 may advantageously be a semiconductor photodiode or a photomultiplier tube. X-ray photons that interact in the scintillation material emit light photons and these will travel to the two photo-detectors where they may be detected. It may be shown that the intensity of the light reaching each photo-detector is in proportion to the distance of the point of interaction from the face of the photo-detector. Therefore, by measuring the relative intensity at the two photo detectors, the point of interaction of the X-ray photon with the detector can be resolved.

Referring back to FIG. 1A, the covert surveillance vehicle 105 is equipped with a plurality of other sensors 110, apart from the X-ray scanning system, in accordance with an aspect of the present invention. In one embodiment, the vehicle 105 is equipped with a GPS receiver the output of which is integrated with the on-board X-ray scanning system to provide the absolute location at which each scan line is conducted. Again, output from a scanning laser is reconstructed into a 2D image to provide a quantitative analysis of the scene around the vehicle. This 2D image is archived for subsequent analysis and review.

The 2D laser scanner image may also be used to determine when the overall scan of a particular object should start and when the scan for that object is complete.

Also, optical wavelength colour CCTV images are collected at the front and sides of the vehicle, ideally using pan-tilt-zoom capability, to allow clear review of all locutions around the vehicle. In one embodiment, images from the CCTV cameras are analysed to read license plate and container codes and this data is also archived along with the X-ray, GPS and all other surveillance data. Similarly, infrared cameras can also be used to monitor the scene around the vehicle to look for unexpectedly warm or cold personnel as indication of stress or presence of improvised explosive devices. This data is also archived along with X-ray and all other surveillance data.

In one embodiment, audio microphones at also installed around the vehicle to listen for sounds that are being produced in the vicinity of the vehicle. Specialist microphones with pan-tilt capability are installed to listen to sounds from specific points at some distance from the vehicle, this direction being analysed from the CCTV and IR image data.

Directional RF (Radio Frequency) antennas are installed in the skin of the vehicle to listen for the presence of electronic devices in the vicinity of the vehicle. This data is integrated with the rest of the surveillance data. Similarly, wide band antennas are installed with receiving devices that monitor communications channels that may be used by law enforcement, military and emergency services. Again, RF antennas are installed to monitor mobile phone communications including, text messaging from the local region around the vehicle.

In one embodiment, chemical sensors are also installed to monitor composition of the air around the vehicle to detect trace quantities of explosives, narcotics and other relevant compounds with this data being integrated with that generated by the imaging and other sensors.

In accordance with another aspect of the present invention, an automated detection processor integrates and analyses all surveillance information from the plurality of sensors 110, in real-time, to highlight threat items for review by an operator seated inside the vehicle 105 and/or remotely through a secured wireless network. In one embodiment, data from the individual sensors is analysed for key signatures. For example, the X-ray data is analysed for detection of improvised explosive devices or for the presence of organic materials in unexpected places (such as the tyres of a car). CCTV data is analysed for license plates with cross-checking against a law enforcement database. Audio information is analysed for key words such as "bomb" or "drugs", for unexpectedly fast or deliberate phrasing which may indicate stress, or for a non-native language in the presence of a native language background for example. Once a piece of information has been analysed to comprise a threat or risk, this is escalated up a decision tree and is then compared against automated risk analysis from other sensors. If correlated risks are detected, a significant threat alarm is raised for immediate action by a human operator. If no correlated risk is detected, a moderate threat alarm is raised for review by the operator. The result is a managed flow of information where all sensor surveillance information is analysed at all times, and only significant threat information is passed up the decision tree to reach the final level of an alert to a system operator. The detection processor, in one embodiment, is a microprocessor computer running relevant code programmed for managing information and decision flow based on correlation and aggregation of the plurality of surveillance information.

Figure 13:
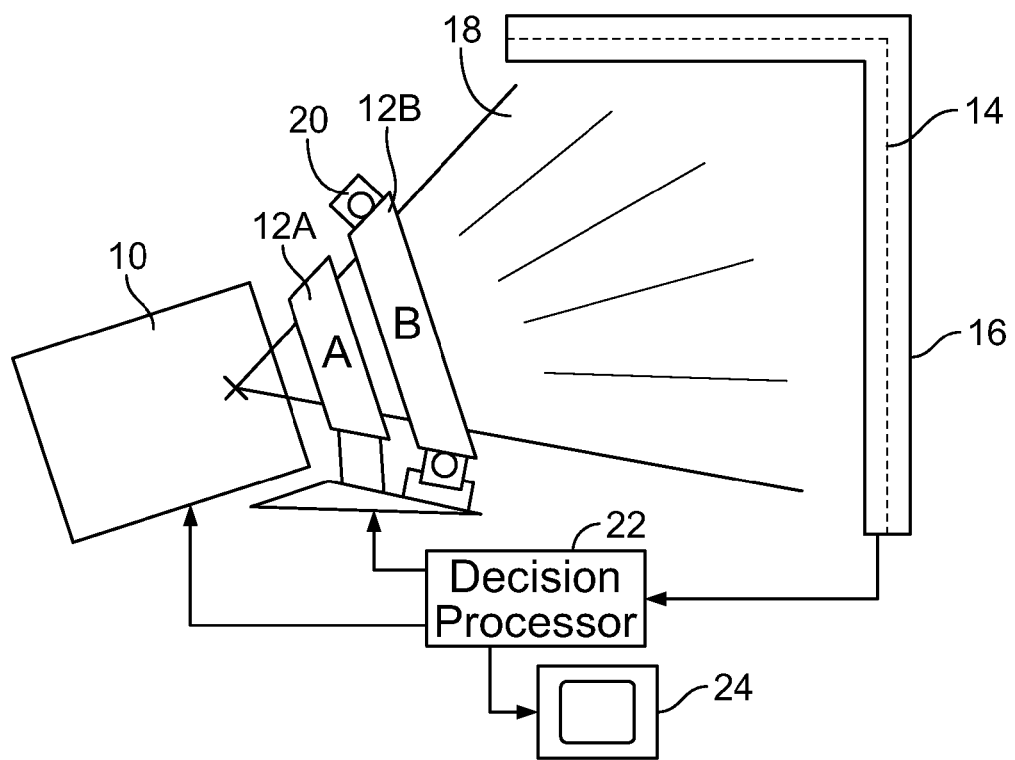
FIG. 13 is a schematic representation of a radiation imaging system that may be employed in accordance with the present invention.

Great Britain Provisional Patent Application Number 1001736.6, entitled "Image Driven Optimization", and filed on Feb. 3, 2010, and Patent Cooperation Treaty (PCT) Application Number GB2011/050182 entitled "Scanning Systems", and filed on Feb. 3, 2011 by the Applicant of the present specification, both herein incorporated by reference in their entirety disclose a scanner system comprising a radiation generator arranged to generate radiation to irradiate an object, and detection means arranged to detect the radiation after it has interacted with the object and generate a sequence of detector data sets. Referring to FIG. 13, a scanner system comprises an X-ray beam generation system which includes a shielded radiation source 10, a primary collimator set 12A and a secondary collimator set 12B, and a set of radiation detectors 14 configured into a folded L-shaped array 16, are disclosed.

The primary collimator set 12 A acts to constrain the radiation emitted by the source 10 into a substantially fan-shaped beam 18. The beam 18 will typically have a fan angle in the range +/−20 degrees to +/−15 degrees with a width at the detector elements 14 in the range 0.5 mm to 50 mm. The second collimator set 12B is adjustably mounted and the position of the two second collimators 12B can be adjusted by means of actuators 20, under the control of a decision processor 22. The detectors 14 output detector signals indicative of the radiation intensity they detect and these form, after conversion and processing described in more detail below, basic image data that is input to the decision processor 22. The decision processor 22 is arranged to analyse the image data and to control the actuators 20 to control the position of the second collimator set 12B in response to the results of that analysis. The decision processor 22 is also connected to a control input of the radiation source 10 and arranged to generate and vary a control signal it provides to the control input to control the energy and timing of X-ray pulses generated by the radiation source 10. The decision processor 22 is also connected to a display 24 on which an image of the imaged object, generated from the image data, can be displayed.

By way of example, the radiation source 10 may comprise a high energy linear accelerator with a suitable target material (such as tungsten) which produces a broad X-ray spectrum with a typical beam quality in the range from 0.8 MV to 15 MV from a relatively small focal spot typically in the range 1 mm to 10 mm diameter. The radiation source 10 in this case would be pulsed with a pulse repetition frequency generally in the range 5 Hz to 1 kHz where the actual rate of pulsing is determined by the decision processor 22.

The detectors 14 in this case are advantageously fabricated from a set of scintillation crystals (generally high density scintillator such as CsI, CdO4, ZnW04, LSO, GSO and similar are preferred) which are optically coupled to a suitable light detector, such as a photodiode or photomultiplier tube. Signals from these detectors 14 converted to digital values by a suitable electronic circuit (such as a current integrator or trans impedance amplifier with bandwidth filtering followed by an analogue to digital converter) and these digital values of the sampled intensity measurements are transferred to the decision processor 22 for analysis. The primary 12 A and secondary 12B collimators in this case are advantageously fabricated from high density materials such as lead and tungsten.

A plurality of active devices are installed on the vehicle 105 to help mitigate against threats that may be present proximate to the covert inspection vehicle itself. For example, a jamming device can be installed to block mobile phone communication. This device may be turned on automatically in certain situations based on results from the automated decision processor. For example, should an improvised explosive device be detected in the vicinity of the vehicle the jamming device is turned on automatically to block spoken commands to a subversive or to prevent direct communication to the trigger of the explosive device. A jamming device can also be installed to block satellite communications required in order to prevent satellite phone communications that may result in subversive activity.

In one embodiment the covert inspection vehicle 105 is operated by a single person with the primary responsibility for driving the vehicle. Surveillance data can be broadcast back to a central intelligence location in real time, as required, with download of the full archived surveillance data once the vehicle returns to its home location. The automated decision processor can action or trigger appropriate events, depending upon the decision steps programmed therein, without operator intervention to avoid the driver loosing focus on their primary task. In another embodiment, the covert inspection vehicle 105 is also provided with space for another security operative whose task is to monitor the surveillance data stream as it arrives from the plurality of sensors either in parallel with the automated decision processor or as a consequence of information from the automated decision processor. This operator is provided with two way secure wireless communication back to a central intelligence location in order to transact instructions and actions as required.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An inspection system comprising:
   an X-ray scanning system comprising an X-ray source configured to emit X-ray beams and a plurality of detectors configured to acquire data representative of a radiographic image of an object located proximate to the inspection system;
   one or more sensors adapted to determine data representative of a distance from at least one of the plurality of detectors to an area on a surface of the object; and
   a processor configured to process the obtained radiographic image, wherein the processor is configured to apply a correction to the obtained radiographic image based on the determined data representative of the distance.

2. The inspection system of claim 1, wherein the correction is a modification of a brightness of the obtained radiographic image based on the determined data representative of the distance.

3. The inspection system of claim 1, wherein the correction is a modification of an intensity of the obtained radiographic image based on the determined data representative of the distance.

4. The inspection system of claim 3, wherein the modification of the intensity of the obtained radiographic image comprises applying an intensity correction to the obtained radiographic image such that the intensity of the obtained radiographic image located at a distance greater than a first predefined distance is reduced by a first predefined factor and the intensity of the obtained radiographic image located at a distance less than a second predefined distance to be increased by a second predefined factor.

5. The inspection system of claim 1, wherein the correction is a geometric correction of the obtained radiographic image to generate an accurate representation of a shape of an object in the obtained radiographic image.

6. The inspection system of claim 5, wherein the one or more sensors comprises a light-based range finder system.

7. The inspection system of claim 6, wherein the processor is configured to calculate an equivalent distance between the X-ray beams generated at a portion of the X-ray source and the surface of the object based on a determination of a relative position of the portion of the X-ray source and a portion of the light-based range finder system.

8. The inspection system of claim 1, wherein the one or more sensors comprises a source of infrared light and a controller configured to determine a time for infrared light scattered from the surface of the object to return to the one or more sensors.

9. The inspection system of claim 1, wherein the processor is configured to modify a color of one or more pixels in the obtained radiographic image based on the determined data representative of the distance.

10. The inspection system of claim 1, wherein the plurality of detectors comprise at least one of a semiconductor material having a wide bandgap, CdTe, CdZnTe, HgI, a semiconductor material having a narrow bandgap, or HPGe.

11. The inspection system of claim 1, wherein the X-ray source is configured to generate a pencil beam and wherein the plurality of detectors is configured to detect X-rays backscattered from the object.

12. A method for obtaining a radiographic image of an object located proximate to an inspection system, comprising:
using an X-ray source configured to emit X-ray beams;
acquiring data representative of the radiographic image of the object using a plurality of detectors;
determining, using one or more sensors, data representative of a distance from at least one of the plurality of detectors to an area on a surface of the object; and,
processing the obtained radiographic image using a processor, by applying a correction to the obtained radiographic image based on the determined data representative of the distance.

13. The method of claim 12, wherein the correction is a modification of a brightness of the obtained radiographic image based on the determined data representative of the distance.

14. The method of claim 12, wherein the correction is a modification of an intensity of the obtained radiographic image based on the determined data representative of the distance.

15. The method of claim 14, wherein the modification of the intensity of the obtained radiographic image comprises applying an intensity correction to the obtained radiographic image such that the intensity of the obtained radiographic image located at a distance greater than a first predefined distance is reduced by a first predefined factor and the intensity of the obtained radiographic image located at a distance less than a second predefined distance to be increased by a second predefined factor.

16. The method of claim 12, wherein the correction is a geometric correction of the obtained radiographic image to generate an accurate representation of a shape of an object in the obtained radiographic image.

17. The method of claim 16, wherein the one or more sensors comprises a light-based range finder system.

18. The method of claim 17, further comprising calculating, using the processor, an equivalent distance between the X-ray beams generated at a portion of the X-ray source and the surface of the object based on a determination of a relative position of the portion of the X-ray source and a portion of the light-based range finder system.

19. The method of claim 12, wherein the one or more sensors comprises a source of infrared light and a controller configured to determine a time for infrared light scattered from the surface of the object to return to the one or more sensors.

20. The method of claim 12, further comprising modifying, using the processor, a color of one or more pixels in the obtained radiographic image based on the determined data representative of the distance.

21. The method of claim 12, wherein the plurality of detectors comprise at least one of a semiconductor material having a wide bandgap, CdTe, CdZnTe, HgI, a semiconductor material having a narrow bandgap, or HPGe.

22. The method of claim 12, wherein the X-ray source is configured to generate a pencil beam and wherein the plurality of detectors is configured to detect X-rays backscattered from the object.

* * * * *